US012699670B2

(12) United States Patent
Piwko

(10) Patent No.: US 12,699,670 B2
(45) Date of Patent: Aug. 4, 2026

(54) APPARATUSES AND METHODS

(71) Applicant: Intel Corporation, Santa Clara, CA (US)

(72) Inventor: Maciej Piwko, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/936,862

(22) Filed: Sep. 30, 2022

(65) Prior Publication Data

US 2023/0025517 A1 Jan. 26, 2023

(51) Int. Cl.
G06F 13/42 (2006.01)
G06F 1/3203 (2019.01)

(52) U.S. Cl.
CPC ........ G06F 13/4221 (2013.01); G06F 1/3203 (2013.01); *G06F 2213/0026* (2013.01)

(58) Field of Classification Search
CPC ............... G06F 13/4221; G06F 1/3203; G06F 2213/0026
See application file for complete search history.

(56) References Cited

U.S. PATENT DOCUMENTS

2009/0327774 A1* 12/2009 Jeyaseelan ............. G06F 1/325
710/316
2014/0082242 A1* 3/2014 Murphy ................. G06F 13/24
710/263
2014/0085791 A1* 3/2014 Hinck ...................... G06F 1/10
361/679.3
2014/0189409 A1* 7/2014 Jeyaseelan ............. G06F 13/20
713/324
2014/0195833 A1* 7/2014 Wang .................... G06F 1/3253
713/320

* cited by examiner

*Primary Examiner* — Nimesh G Patel
(74) *Attorney, Agent, or Firm* — 2SPL Patent Attorneys PartG mbB; Kieran O'Leary

(57) ABSTRACT

An apparatus is provided. The apparatus comprises interface circuitry, machine-readable instructions, and processing circuitry to execute the machine-readable instructions to determine that a first composite link of a plurality of composite PCIe links terminating at the same PCIe root port lacks support for enabling a desired power saving state or an exit latency for the first composite link is above a first latency threshold. The processing circuitry is further configured to determine whether an exit latency for a second composite link of the plurality of composite PCIe links is below a second latency threshold and selectively trigger at least one sub-link of the second composite link to enable the desired power saving state if the exit latency for the second composite link is below the second latency threshold.

25 Claims, 12 Drawing Sheets

300

310

321 322 ••• Root Complex 325 326

Bus#1

331
Bus#2

341

342

334

332

333

352

351

200

300

310

300

310

400 determining that a first composite link of a plurality of composite PCIe links terminating at the same PCIe root port lacks support for enabling a desired power saving state or an exit latency for the first composite link is above a first latency threshold

410 determining whether an exit latency for a second composite link of the plurality of composite PCIe links is below a second latency threshold

420 selectively triggering at least one sub-link of the second composite link to enable the desired power saving state if the exit latency for the second composite link is below the second latency threshold

determining that a composite PCIe link lacks support for enabling a desired power saving state or an exit latency for the composite link is above a latency threshold

510 determining that an exit latency of the composite link, with a first subset of sub-links having enabled the desired power saving state and a second subset of sub-links having disabled the desired power saving state, is below the latency threshold and that the first subset supports enabling the desired power saving state

520 selectively triggering at least one sub-link of the first subset to enable the desired power saving state

*TotalPathLxExitLatency
– it could be
TotalPathL0sExitLatency
or
TotalPathL1ExitLatency
depends whether the run
is for L0s or L1

600-2

600-4

APPARATUSES AND METHODS

BACKGROUND

In peripheral component interconnect express (PCIe) systems, power management is con-trolled by a power management system. When a conventional power management system is used, some links of the PCIe system may be unable to enter a power-saving state even when they are idle.

Hence, there may be a demand for an improved power management in PCIe systems.

BRIEF DESCRIPTION OF THE FIGURES

Some examples of apparatuses and/or methods will be described in the following by way of example only, and with reference to the accompanying figures, in which

FIG. 4 shows a flowchart of an example of a method;

FIG. 5 shows a flowchart of another example of a method; and

DETAILED DESCRIPTION

Figure 1A:
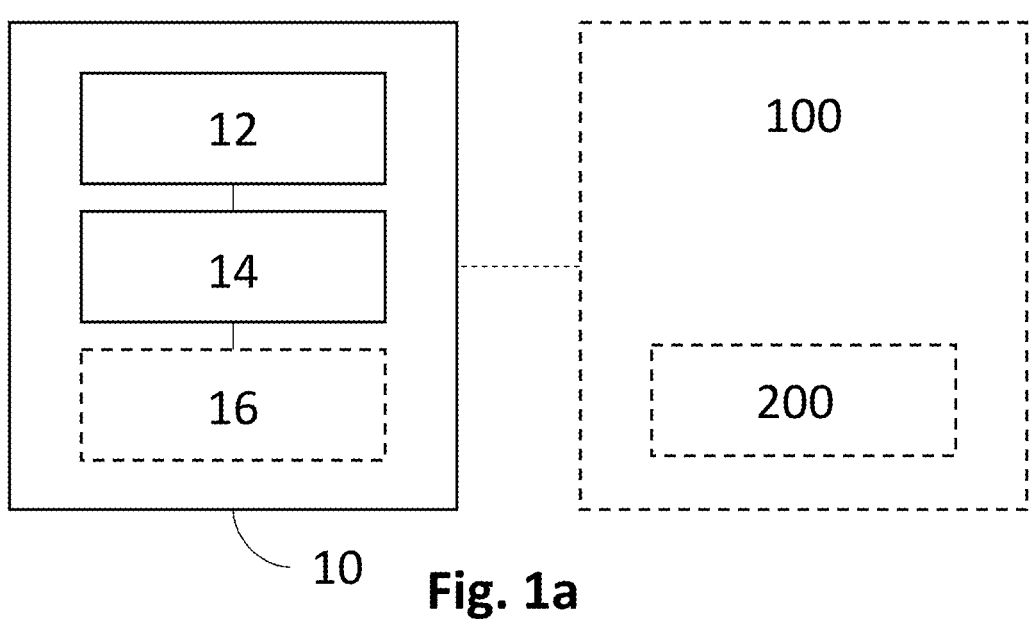
FIG. 1a and FIG. 1b show an example of an apparatus or device, and of a computer system comprising such an apparatus or device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different in-stances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

Figure 1B:
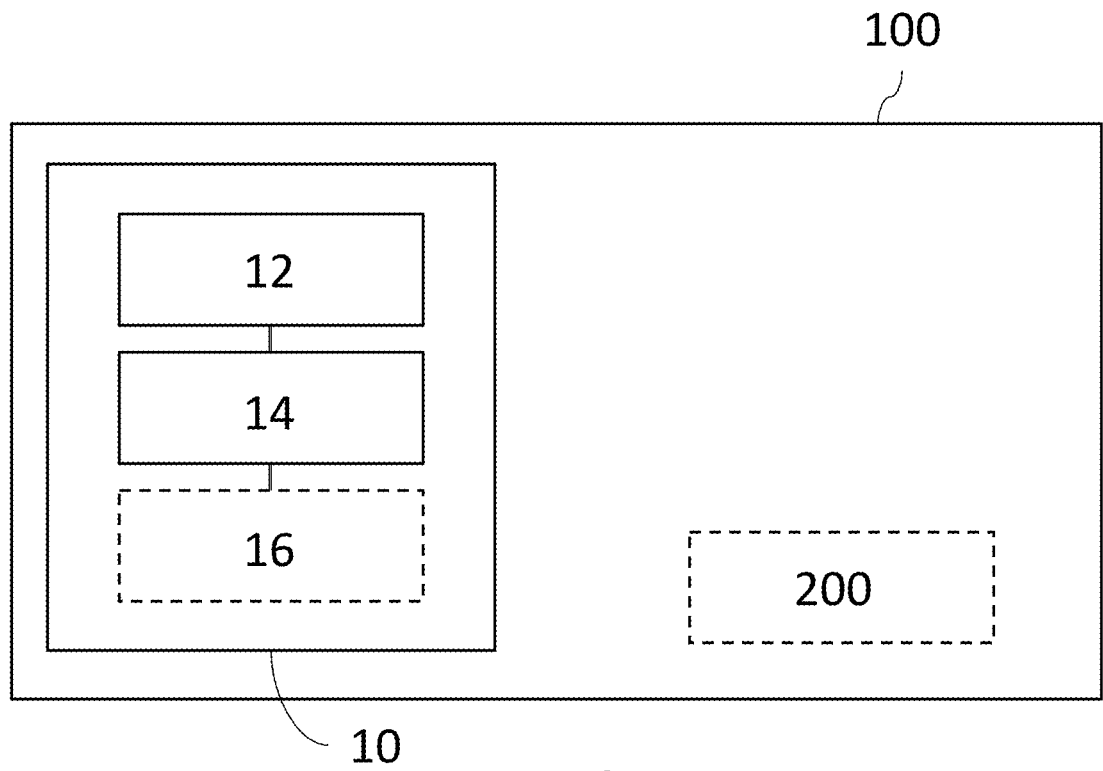

FIG. 1a shows a block diagram of an example of an apparatus 10 or device 10 communicatively coupled to a computer system 100. FIG. 1b shows a block diagram of an example of a computer system 100 comprising an apparatus 10 or device 10.

The apparatus 10 comprises circuitry that is configured to provide the functionality of the apparatus 10. For example, the apparatus 10 of FIGS. 1a and 1b comprises interface circuitry 12, processing circuitry 14 and (optional) storage circuitry 16. For example, the processing circuitry 14 may be coupled with the interface circuitry 12 and with the storage circuitry 16.

For example, the processing circuitry 14 may be configured to provide the functionality of the apparatus 10, in conjunction with the interface circuitry 12 (for exchanging information, e.g., with other components inside or outside the computer system 100) and the storage circuitry (for storing information, such as machine-readable instructions) 16.

Likewise, the device 10 may comprise means that is/are configured to provide the functionality of the device 10.

The components of the device 10 are defined as component means, which may correspond to, or implemented by, the respective structural components of the apparatus 10. For example, the device 10 of FIGS. 1a and 1b comprises means for processing 14, which may correspond to or be implemented by the processing circuitry 14, means for communicating 12, which may correspond to or be implemented by the interface circuitry 12, and (optional) means for storing information 16, which may correspond to or be implemented by the storage circuitry 16. In the following, the functionality of the device 10 is illustrated with respect to the apparatus 10. Features described in connection with the apparatus 10 may thus likewise be applied to the corresponding device 10.

In general, the functionality of the processing circuitry 14 or means for processing 14 may be implemented by the processing circuitry 14 or means for processing 14 executing machine-readable instructions. Accordingly, any feature ascribed to the processing circuitry 14 or means for processing 14 may be defined by one or more instructions of a plurality of machine-readable instructions. The apparatus 10 or device 10 may comprise the machine-readable instructions, e.g., within the storage circuitry 16 or means for storing information 16.

Examples of techniques described herein relate to the context of PCIe. PCIe is an I/O (input/output) bus standard used to interconnect peripheral devices in, e.g., computing or communication architectures (platforms), such as the computer system 100. The apparatus 10 may be communicatively coupled to a PCIe system 2200 which exhibits a topology in accordance with the PCIe standard. For instance, the PCIe system 200 may be integrated into the computing system 100.

Figure 1C:
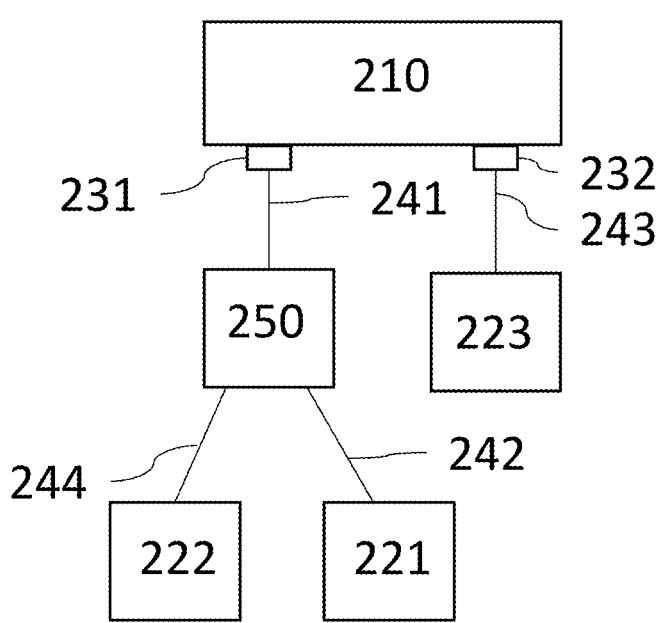
FIG. 1c shows an example of a PCIe system.

In FIG. 1*c*, an example of a structure of the PCIe system 200 is shown. The PCIe system 200 comprises a root complex (device) 210 which may denote a root of an (I/O) hierarchy. The root complex 210 may connect a (central) processing unit (e.g., of the computing system 100) to a PCIe fabric (an I/O interface) to be connected to at least one endpoint (e.g., a PCIe device or PCI device), e.g. endpoints 221, 222 and 223. The root complex 210 may generate transaction requests on behalf of the processing unit.

The root complex 210 comprises at least one PCIe root port, e.g., root ports 231 and 232, which is to be connected to at least one endpoint, e.g., endpoints 221, 222. The root port may be connected to the endpoint via at least one (sub-) link (i.e., a point-to-point interconnect or bus), e.g., sub-link 241, 242, 243, 244. Sub-links may be interconnected by at least one intermediate component (such as a switch or bridge), e.g., intermediate component 250. The sub-links 241, 242, 243, 244 may comprise any number of lanes for, e.g., differential signaling between one end (port) of the sub-link to the other (port), and thus between the root complex 210 and the endpoints 221, 222.

The PCIe fabric provides a hierarchy, i.e., a tree structured PCIe interconnect topology. The hierarchy comprises at least one hierarchy domain (i.e., a part of the hierarchy originating from a single PCIe root port) which comprises a plurality of composite PCIe links terminating at the same PCIe root port. A composite PCIe link may comprise all sub-links along a signal path from one endpoint of the hierarchy domain to the PCIe root port. An example of a first composite link terminating at the root port 231 comprises sub-links 241 and 244, thus, connecting endpoint 222 to root port 231. An example of a second composite link terminating at the same root port, root port 231, comprises sub-links 241 and 242, thus, connecting endpoint 221 to root port 231.

It is to be noted that the structure of the PCIe system 200 shown in FIG. 1*c* is meant for illus-trative purposes. In other examples, the PCIe system 200 may comprise any other number of root ports, any other number of sub-links, any other number of composite links, any other number of endpoints or any other number of intermediate components than shown in FIG. 2*c*. Further, an arrangement of interconnections between the sub-links, components and endpoints may be different than the one shown in FIG. 2*c*. Further, a number of ports of the components may be different than the one shown in FIG. 2*c*.

The PCIe system 200 features a power management capability, i.e., the PCIe system 200 comprises hardware and/or software for controlling sub-links (and optionally components) to transition to a certain power saving state. The PCIe system 200 may further be configured to, by means of the hardware and/or software, wake the sub-links (and/or components) up from a power saving state on a specific event. The PCIe system 200 may also be configured to identify a current power saving state of the sub-links and/or a power management capability of the sub-links, i.e., which power saving states are supported by the sub-links.

It may be desirable for some applications that a certain power saving state (a desired power saving state) is enabled for as many sub-links (and/or components) of the hierarchy domain as possible, e.g., in order to decrease an energy consumption of the PCIe system 200. For instance, the PCIe system 200 may activate a certain power saving state for a sub-link which has that power saving state enabled (e.g., L0s, L1) after a certain period of idle time. In the power saving state, the sub-link may consume less electrical energy than in an active state (L0). The PCIe system 200 may transition the sub-link back to the fully operative active state, e.g., when traffic appears on either side of the sub-link.

Whether an enablement of a certain power saving state is possible or not for a certain sub-link may depend on constraints of the PCIe system 200, e.g., on a power management capability of the sub-link and a limitation regarding an exit latency of the associated composite link. The exit latency may indicate a time interval or a range of time that is expected for a transition to the active state.

Compared to conventional PCIe power management techniques, techniques described herein may achieve a higher number of sub-links with an enabled power saving state without violating the above-mentioned constraints.

Conventional PCIe power management techniques may—at least in two scenarios—fail to increase a number of sub-links with enabled power saving state. For example, in a first scenario, multiple composite links terminate at the same root port of the root complex. If, due to a constraint on one of the composite links, the composite link cannot enter the power saving state, all of the composite links are affected, as at least the sub-link connecting to the root port cannot enter into the power saving state. Conventional techniques may disable the desired power saving state for all sub-links of the plurality of composite links since at least one sub-link may be shared among the plurality of composite links (e.g., at least the sub-link connected to the root port may be shared). In a second scenario, enabling a desired power saving state for all sub-links of a composite link would lead to a violation of a constraint (e.g., an exit latency for the composite link exceeding a predetermined threshold or not all sub-links support enabling the desired power saving state). Conventional techniques may disable the desired power saving state for all sub-links of the composite link in the second scenario.

By contrast, the apparatus 10 may—e.g., in the first scenario-increase the number of sub-links with an enabled power saving state, as described in the following.

The processing circuitry 14 is configured to determine that a first composite link of the plurality of composite PCIe links terminating at the same PCIe root port lacks support for enabling a desired power saving state (and/) or an exit latency for the first composite link is above a first latency threshold. In other words, the processing circuitry 14 may determine that the first composite link violates a constraint of the PCIe system 200 for enabling the desired power saving state.

Examples for the desired power saving state of sub-links may be, e.g., L0s (standby), L1 (lower power standby), L2 (low power sleep state), L3 (off). Examples for the desired power saving state of components may be, e.g., D1, D2 or D3. Each power saving state may lead to a specific power consumption level, a specific exit latency and may have specific requirements, e.g., in terms of platform or component behavior or in terms of usage (e.g., directed or active state power management usage). For instance, some power saving states may require a reference clock or (main or auxiliary) power supply provided by a platform to the sub-link to be cut off or an internal phase-locked loop of a component connected to the sub-link to be shut off.

Support may be lacking if a requirement of the desired power saving state cannot be fulfilled by, e.g., the affected platform, component, usage instance (e.g., directed or active state power management) or sub-link, or if in the power management settings of a sub-link the desired power saving state is indicated as not permitted. The exit latency for the first composite link may be based on the above-mentioned specific exit latency of the power saving state.

For determining a violation of the constraint, the processing circuitry 14 may be configured to receive via the interface circuitry 12 a report that the constraint (support for enabling the desired power saving state and/or limit of the exit latency for the first composite link to the first latency threshold) is violated. Alternatively, the processing circuitry 14 may be configured to query the exit latency for the first composite link (or the exit latency for each sub-link of the first composite link) and the power management setting of the first composite link (or the setting of each sub-link), and verify the compliance with the constraint based on the queried exit latency and power management setting (which indicate which power saving states are supported).

The processing circuitry 14 is further configured to determine whether an exit latency for a second composite link of the plurality of composite PCIe links is below (or equal to) a second latency threshold.

The exit latency for the second composite link may be a time interval needed for all sub-links of the second composite link with an enabled power saving state to transition from a respective enabled power saving state to an active state. In some examples, the exit latency for the second composite link is based on a sum of exit latencies for a plurality of sub-links of the second composite link. For instance, the exit latency for the second composite link is based on a sum of exit latencies for sub-links which have an enabled power saving state (e.g., the desired power saving state or a further power saving state). For instance, a respective latency for each sub-link of the plurality of sub-links may be based on (e.g., correspond to) a respective time interval which said sub-link requires (e.g., potentially or in a worst case) to transition from an enabled power saving state to an active state. The sum of exit latencies may be determined based on the respective time intervals. In other words, (only) sub-links of the second composite link which have an enabled power saving state may contribute to the exit latency for the second composite link.

In some examples, if no power saving state for a sub-link is enabled, that sub-link would not have an exit latency or have an exit latency of 0s (seconds). In some examples, if more than one power saving state is enabled for a sub-link, the exit latency for the sub-link would correspond to an exit latency of an enabled power saving state with the lowest power consumption or the highest specific exit latency.

In some examples, the exit latency for the second composite link is further based on an exit latency of a component of the second composite link, e.g., a switch or bridge connected to the plurality of sub-links. For instance, the exit latency may be based on a sum of exit latencies of a plurality of switches and/or bridges of the second composite link. For instance, switches or bridges connected with a downstream port to a sub-link with an enabled power saving state may contribute to the exit latency for the second composite link.

The first and/or second threshold may be defined by settings of the endpoints of the PCIe system 200 which may be reported to the apparatus 10. In some examples, the first threshold is based on a maximal exit latency accepted by an endpoint of the first composite link and/or the second latency threshold is based on a maximal exit latency accepted by an endpoint of the second composite link. For instance, a certain endpoint may withstand a limited exit latency (below a threshold) for its associated composite link before risking, for example, internal FIFO (first in first out) overruns.

The processing circuitry 14 is configured to selectively trigger at least one sub-link of the second composite link to enable the desired power saving state if the exit latency for the second composite link is below (or equal to) the second latency threshold.

That is, if the processing circuitry 14 determines that the second composite link adheres to a constraint of the PCIe system 200 with a first configuration (e.g., an initial configuration) of the second composite link, the processing circuitry 14 may, in response to that, trigger the at least one sub-link to enable the desired power saving state. A configuration may indicate, e.g., which sub-links of the plurality of sub-links of a composite link has which power saving state (e.g., the desired power saving state and/or a further power saving state) enabled/disabled. The first configuration may, e.g., indicate that no sub-link or not all of the sub-links of a plurality of sub-links of the second composite link has the desired power saving state enabled.

The processing circuitry 14 may, e.g., select the sub-link among the plurality of sub-links of the second composite link, e.g., randomly or based on a certain selection scheme, and trigger the selected sub-link to enable the desired power saving state. For instance, the processing circuitry 14 may select the sub-link among a subset of sub-links for which the desired power saving state is not yet enabled, for which no power saving state is enabled or for which no power saving state with a power consumption level equal or lower than the desired power saving state is enabled. The processing circuitry 14 may, in some examples, select the sub-link among a subset of sub-links which are not shared with the first composite link.

The processing circuitry 14 may select the sub-link among a subset of sub-links for which enablement of the desired power saving state is supported. For instance, the processing circuitry 14 may be configured to determine whether the sub-link supports enabling the desired power saving state. The sub-link may be selectively triggered to enable the desired power saving state if it is determined that the sub-link supports enabling the desired power saving state.

If n denotes the number of sub-links of the second composite link, any number m of sub-links with $1 \leq m \leq n$ may be triggered to enable the desired power saving state.

The triggering of an enablement of a certain power saving state may, e.g., relate to a change of a (feature) setting of a power management of the PCIe system 200. For instance, an active state power management (ASPM) may allow sub-links to autonomously enter a power saving state if, in the setting, the power saving state is indicated as enabled for these sub-links. Once the sub-link needs to communicate/be used again, it may be returned to an operational state.

In many applications, the PCIe hierarchy may be very complicated (e.g., comprise many hierarchy levels, components, and/or sub-links). Determining (managing) which sub-links can have which power saving state allowed (enabled), e.g., based on latency requirements or other constraints, may be equally complicated. Conventional PCIe power management techniques may only provide binary solutions, i.e., either a complete hierarchy domain has enabled or disabled the desired power saving state. This means, that further optimizations may be disregarded by the conventional techniques.

By contrast, the techniques described herein, such as with reference to apparatus 14, may provide such an optimization based on a "higher resolved" testing of the hierarchy domain, i.e., they may provide a testing of individual sub-links or a subset of sub-links within a composite link of the hierarchy domain on whether an enablement of the desired power saving state is possible, in consideration of constraints of the composite link. This may lead to a higher number of sub-links with an enabled power saving state, thus, to a reduced overall power consumption of the PCIe system 200. The potential savings may depend on the specific topology and data rate of the PCIe system 200.

For instance, in a concrete application, the desired power saving state is the L1 sub state according to the PCIe specification. With a conventional power management, no sub-link of an exemplary composite link may have L1 enabled. Instead, all sub-links of the composite link may consume full power (active state power).

One lane of a sub-link may, e.g., consume ~20 mW (milliwatt) of power, which may result, in the concrete application, in a consumption of ~320 mW of power per port. If a PCIe system has 4 ports it may yield 1,2 W of power, even if the ports are in an idle state. If a sub-link is in L1 state, an L1 sub state (L1.2) may be turned on. Said sub-link may consume 0,1uW (microwatts).

If in the concrete application the topology comprises two 4-port switches within one hierarchy domain, this may result in a total of 12 (including root ports coupled to the CPU, central processing unit)×16 PCIe ports. The topology may have one device connected to one of the switches which is, in turn, connected to one of the ports of the other one of the switches.

With a conventional power management, only root ports may turn its associated sub-links into L1 sub states. This means that 7×16 ports may still supply its sub-links with full power, while being in idle. That may result in 2,2 W of power constantly being consumed (seeping). With techniques as described herein, these ports (i.e., the connected sub-links) may enter L1 state and L1 sub states. Consequently, these ports may consume ~11,2uW of total power (in comparison to 2,2 W without the techniques being performed on the topology). In big topologies, in topologies with limited power supply or with the device being sensitive to power, the aforementioned power savings may be crucial for the feasibility of an application.

The techniques described herein may enable a modification of the power management (e.g., ASPM) capability of a PCIe system to achieve optimized settings to save power. The techniques may allow a subset of sub-links to enable (reach out to) a power saving state in different cases. This may increase power savings while still maintaining bandwidth and performance of the PCIe system. The techniques may be particularly beneficial for PCIe systems comprising different hierarchy levels and devices which may have differing ASPM support as well as latency requirements.

In some examples, the processing circuitry 14 is further configured to selectively trigger at least one of the sub-link and a further sub-link of the second composite link to disable the desired power saving state or a further power saving state if it is determined that the exit latency is above the second latency threshold. The further power saving state may be a power saving state with a higher or lower power consumption level than the desired power saving state.

For instance, the processing circuitry 14 may select the sub-link or the further sub-link and the power saving state to be disabled for the selected sub-link/further sub-link, e.g., randomly or on a certain selection scheme. The selection scheme may depend on, e.g., power management capabilities of the sub-links or any further requirements given by the application, e.g., indicating that some sub-links shall preferably be set to the desired power saving state over other sub-links. This may provide more degrees of freedom in optimizing the configuration of the second composite link.

In some examples, the processing circuitry 14 is further configured to determine whether an updated exit latency for the second composite link is below (or equal to) the second latency threshold after selectively triggering the sub-link to enable the desired power saving state. For instance, the enablement of the desired power saving state for the sub-link may lead to a second configuration of the second composite link. The processing circuitry 14 may check the compliance with given constraints for the second configuration. An update of the exit latency, yielding the updated exit latency, may consider a change of an exit latency for the sub-link when enabling the desired power saving state.

The processing circuitry 14 may further be configured to, in latter examples, selectively trigger the sub-link to disable the desired power saving state if it is determined that the updated exit latency is above the second latency threshold. That is, the first configuration may be restored if the constraint is violated with the second configuration.

In some examples, the processing circuitry 14 is further configured to selectively trigger a further sub-link of the second composite link to enable the desired power saving state if it is determined that the updated exit latency is (still) below the second latency threshold. This may enable further optimizations of the second composite link as long as the constraints are not violated.

In some examples, the processing circuitry 14 is further configured to selectively trigger the sub-link or the further sub-link to enable a further power saving state if it is determined that the updated exit latency is below (or equal to) the second latency threshold. In the latter examples, it may be assumed that the further power saving state has a lower power consumption than the desired power saving state. The apparatus 10 may therefore enable further optimizations of the second composite link considering different power saving states.

In some examples, the processing circuitry 14 is further configured to determine whether an exit latency for the sub-link is above an exit latency for at least one further sub-link of the second composite link upstream of the sub-link. The sub-link may be selectively triggered to enable the desired power saving state if it is determined that the exit latency for the sub-link is above the exit latency for the further sub-link. "Upstream" may relate to a relative position of the further sub-link that is closer to the root complex. For instance, a further constraint for enabling the desired power saving state may be that the exit latency for the sub-link shall be greater than or equal to the (e.g., summed) exit latency for at least one other (e.g., all) upstream sub-links (further sub-link). The latter may be beneficial for applications where sub-links are woken up one after another, starting at the root complex and continuing downstream until the endpoint. In these applications, it may be necessary to consider an "upstream exit latency" for the sub-link since otherwise the exit latency requirement for the sub-link may be violated.

In some examples, the processing circuitry 14 is further configured to selectively trigger the further sub-link to disable the desired power saving state or a further power saving state if it is determined that the exit latency for the sub-link is below (or equal to) the exit latency for the further sub-link. This may be beneficial for achieving compliance with the above-mentioned (upstream) exit latency requirement for the sub-link. The apparatus 10 may also increase the degrees of freedom for optimization since a disablement of different power saving state may be verified for achieving compliance.

In examples, where more than one sub-link, e.g., two or more sub-links, of the second composite link are to be checked for compliance with the constraints, the processing circuitry 14 may, e.g., check the compliance collectively for the two or more sub-links or for a sub-link after another in several iterations. For instance, in some examples, the processing circuitry 14 is further configured to selectively trigger iteratively, for each sub-link of a plurality of sub-links of the second composite link, said sub-link to enable the desired power saving state. In latter examples, the plurality of sub-links may refer to sub-links which support enabling the desired power savings state. The processing circuitry 14 may further be configured to determine, in each iteration, whether an updated exit latency for the second composite link is below (or equal to) the second threshold after selectively triggering said sub-link to enable the desired power saving. The processing circuitry 14 may further be configured to selectively trigger said sub-link to disable the desired power saving state if it is determined that the updated exit latency is above the second latency threshold.

For example, the second composite link may comprise a first sub-link, e.g., sub-link 241 in the example shown in FIG. 1c, and a second sub-link, e.g., sub-link 242 in the example shown in FIG. 1c, to be checked (which support the desired power saving state). The processing circuitry 14 may first enable the first sub-link, update the exit latency for the second composite link and check whether the updated exit latency is below the second threshold. If so, the processing circuitry 14 may continue equally with the second sub-link.

The latter may be beneficial for further verifying the compliance with given constraints for several (e.g., all possible) configurations of the second composite link. Thus, the apparatus 10 may allow the determination of a desirable (e.g., an optimal) power management for the second composite link.

In the above iterative approach, further constraints may be checked on each sub-link, in each iteration. For instance, in some examples, the processing circuitry 14 is further configured to determine, in each iteration, whether an exit latency for said sub-link is above an exit latency for at least one further sub-link of the plurality of sub-links upstream to said sub-link and selectively trigger at least one of said sub-link and the further sub-link to disable the desired power saving state or a further power saving state if it is determined that the exit latency for the sub-link is below the exit latency for the further sub-link.

The processing circuitry 14 may, e.g., systematically, go through each sub-link of the plurality of sub-links. Such a systematic may define a starting point for the iterative approach. For instance, in some examples, the processing circuitry 14 is further configured to start the iterative determination at a sub-link of the plurality of sub-links which is connected to an endpoint of the second composite link. Alternatively, the processing circuitry 14 may be configured to start the iterative determination at a sub-link which is connected to the root complex or at a most upstream sub-link which supports the desired power saving state. The latter may be beneficial for a correct checking on the upstream exit latency since the upstream exit In some examples, the processing circuitry 14 is configured to perform the iterative determination by selecting, after each iteration, a subsequent sub-link of the plurality of sub-links which is upstream or downstream to said sub-link.

In some examples, the apparatus 10 further comprises memory circuitry (e.g., the storage circuitry 16 or further storage circuitry) to store, for each sub-link of the plurality of composite links, an indication whether said sub-link has been triggered to enable or disable the desired power saving state. For instance, if an "enable" or "disable" indication has been stored for a certain sub-link in an optimization run performed on the second composite link, said sub-link may be treated as privileged in optimization runs performed on other composite links which share the sub-link with the second composite link, i.e., a disable state of said sub-link may remain untouched by other optimization runs and an enable state may preferably remain untouched (if possible) in other optimization runs. The enable or disable indication may also prevent the apparatus 10 to perform redundant optimizations on the second composite link or other composite links.

In examples where more than one power saving state are supported by at least one sub-link of the second composite link, the processing circuitry 14 may equally apply above verification of compliance with the constraints for each of the power saving states. For instance, the processing circuitry 14 may go through one power saving state after another and check whether compliance with the constraints is achieved for the sub-link when the power saving state is enabled. If so, the processing circuitry 14 may continue with a further power saving state, e.g., in an iterative manner. For instance, in some examples, the processing circuitry 14 is further configured to selectively trigger iteratively, for each power saving state of a plurality of power saving states comprising the desired power saving state, the sub-link to enable said power saving state. The processing circuitry 14 may be configured to determine, in each iteration, whether an updated exit latency for the second composite link is below the second threshold after selectively triggering said sub-link to enable said power saving state and selectively trigger said sub-link to disable said power saving state if it is determined that the updated exit latency is above the second latency threshold.

The latter iterative approach may be performed, e.g., systematically. For instance, the processing circuitry 14 may start the iterative testing of power saving states with a highest power saving state (e.g., L0s) and may continue with a next lower power saving state (e.g., L1 after L0s) in each iteration. If in any iteration, for a certain sub-link, a constraint is violated, the processing circuitry 14 may terminate the iterative testing for that sub-link.

The latter may improve the configuration of the second composite link when several power saving states are possible, thus, further decrease the power consumption of the PCIe system 200. For instance, an exemplary configuration of the second composite link may allow some sub-links to enable a first power saving state and other sub-links to enable a second power saving state and yet other sub-links to disable any power saving state.

The PCIe system 200 may comprise, in some examples, a plurality of composite links which terminate at the same root port. For further improving the power management of the overall PCIe system 200, the processing circuitry 14 may continue verifying compliance with the constraints for further composite links except the first and second composite link. For instance, in some examples, the processing circuitry 14 is further configured to determine, for each composite link of the plurality of composite links, whether a respective exit latency is below a respective latency threshold and selectively trigger at least one sub-link of said composite link to enable the desired power saving state, if it is determined the respective exit latency for said composite link is below the respective latency threshold. That is, the processing circuitry 14 may perform some or all of the above-mentioned functions (explained for the second composite link) on other composite links as well.

The PCIe system 200 may comprise, in some examples, a plurality of composite links which terminate at the same root complex, but not necessarily at the same root port. For further improving the power management of the overall PCIe system 200, the processing circuitry 14 may continue verifying compliance with the constraints for further composite links, e.g., except the first and second composite link. In the example of FIG. 2c, a further composite link comprises sub-link 243, thus, connecting endpoint 223 with root port 232. In some examples, the processing circuitry 14 is further configured to determine whether a respective exit latency, for each composite link of a plurality of composite PCIe links terminating at the same (PCIe) root complex comprising the PCIe root port is below a respective latency threshold and selectively trigger at least one respective sub-link of said composite link to enable the desired power saving state, if it is determined the exit latency for said composite link is below the respective latency threshold. The processing circuitry 14 may, thus, extend the functions explained for the second composite link to other hierarchy domains and further decrease the power consumption of the PCIe system 200.

The apparatus 10 may be implemented by any software and/or hardware. In some examples, the apparatus 10 is implemented by firmware, e.g., of the computer system 100. In other words, the computer system 100 may comprise a firmware, such as a BIOS (Basic Input/Output System) or UEFI (Unified Extensible Firmware Interface), which may in turn comprise the apparatus 10 or device 10. In particular, the apparatus 10 or device 10 may correspond to the firmware, or to a partial functionality of the firmware, of the computer system 100. For example, the apparatus 10 or device 10 may be part of the BIOS or part of the UEFI of the computer system 100. The latter may be beneficial for an early initialization of the PCIe system 200, e.g., during boot of the computer system 100.

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being op-erable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a mi-cro-controller, etc.

For example, the storage circuitry 16 or means for storing information 16 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

Figure 2A:
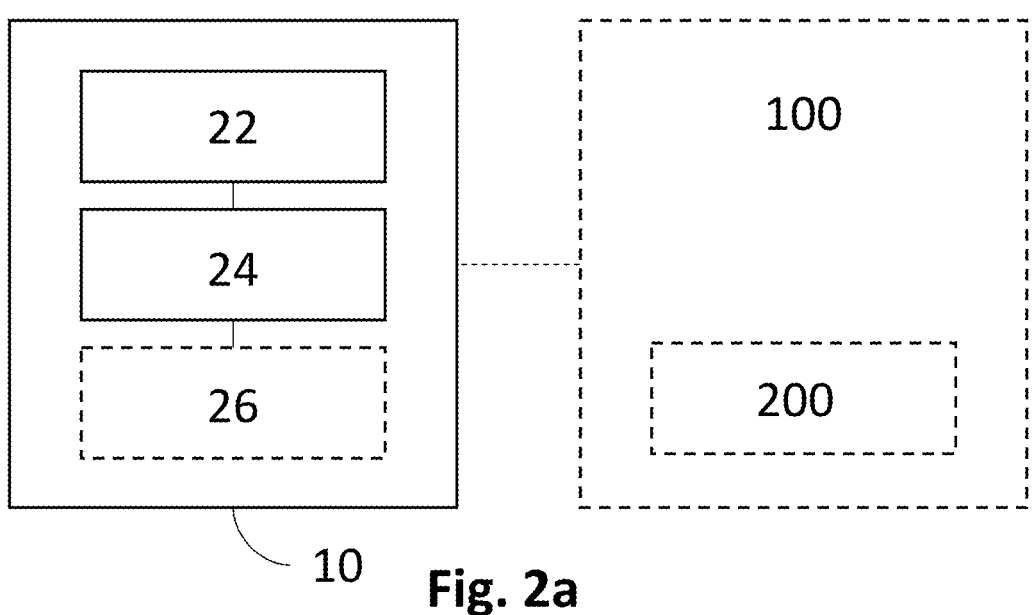
FIG. 2a and FIG. 2b show another example of an apparatus or device, and of a computer system comprising such an apparatus or device.
Figure 2B:
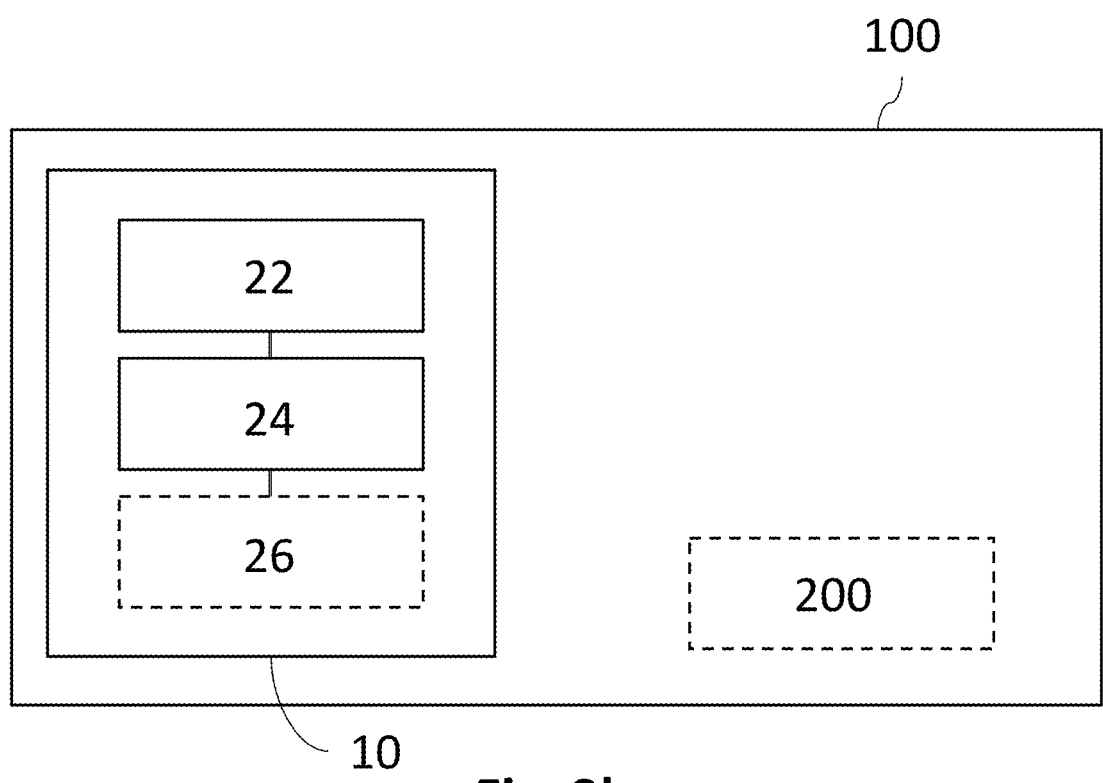

FIG. 2a shows a block diagram of an example of an apparatus 20 or device 20 communicatively coupled to a computer system 100. FIG. 2b shows a block diagram of an example of a computer system 100 comprising an apparatus 20 or device 20.

The apparatus 20 comprises circuitry that is configured to provide the functionality of the apparatus 20. For example, the apparatus 20 of FIGS. 2a and 2b comprises interface circuitry 22, processing circuitry 24 and (optional) storage circuitry 26. For example, the processing circuitry 24 may be coupled with the interface circuitry 22 and with the storage circuitry 26.

For example, the processing circuitry 24 may be configured to provide the functionality of the apparatus 20, in conjunction with the interface circuitry 22 (for exchanging information, e.g., with other components inside or outside the computer system 100) and the storage circuitry (for storing information, such as machine-readable instructions) 26. Likewise, the apparatus 20 may comprise means that is/are configured to provide the functionality of the apparatus 20.

The components of the device 20 are defined as component means, which may correspond to, or implemented by, the respective structural components of the device 20. For example, the device 20 of FIGS. 2a and 2b comprises means for processing 24, which may correspond to or be implemented by the processing circuitry 24, means for communicating 22, which may correspond to or be implemented by the interface circuitry 22, and (optional) means for storing information 26, which may correspond to or be implemented by the storage circuitry 26. In the following, the functionality of the device 20 is illustrated with respect to the apparatus 20. Features described in connection with the apparatus 20 may thus likewise be applied to the corresponding device 20.

In general, the functionality of the processing circuitry 24 or means for processing 24 may be implemented by the processing circuitry 24 or means for processing 24 executing machine-readable instructions. Accordingly, any feature ascribed to the processing circuitry 24 or means for processing 24 may be defined by one or more instructions of a plurality of machine-readable instructions. The apparatus 20 or device 20 may comprise the machine-readable instructions, e.g., within the storage circuitry 26 or means for storing information 26.

Examples of techniques described herein relate to the context of PCIe. PCIe is an I/O (input/output) bus standard used to interconnect peripheral devices in, e.g., computing or communication architectures (platforms), such as the computer system 100. The apparatus 10 may be communicatively coupled to a PCIe system 200 which exhibits a topology in accordance with the PCIe standard. For instance, the PCIe system 200 may be integrated into the computing system 100.

The apparatus 20 may be implemented similarly like the apparatus 10 described above.

In the following, it is described how the apparatus 20 may—e.g., in the above-mentioned second scenario-increase the number of sub-links of the PCIe system 200 with an enabled power saving state.

The processing circuitry 24 is configured to determine that a composite PCIe link lacks support for enabling a desired power saving state or an exit latency for the composite link is above a latency threshold. In some examples, the threshold is based on a maximal exit latency accepted by an endpoint of the composite link. In some examples, the exit latency for the composite link is based on a sum of exit latencies for a plurality of sub-links of the second composite link. The exit latency for the composite link may, in some examples, further be based on an exit latency for a switch or bridge connected to the plurality of sub-links.

The processing circuitry 24 is further configured to determine that an exit latency of the composite link, with a first subset of sub-links having enabled the desired power saving state and a second subset of sub-links having disabled the desired power saving state, is below the latency threshold and that the first subset supports enabling the desired power saving state.

The processing circuitry 24 may, for instance, determine a certain configuration (indicating the first subset and the second subset) of the PCIe system 200 which complies with the above constraints. For instance, the processing circuitry 24 may change a configuration of the PCIe system 200 and check the compliance for the changed configuration. For instance, the processing circuitry 24 may determine the configuration based on trial & error, i.e., the processing circuitry 24 may (e.g., repeatedly or several times) vary the configuration of the PCIe system 200 (trial) and check, for each variation, compliance with the constraints (error if compliance is not given). The latter may be repeated, e.g., continuously, until a valid configuration is found, until a configuration with a lower power than a previous configuration is found, or until a certain variation scheme is completed (e.g., until all possible configurations are checked).

An example of a variation scheme may be iteratively going through all sub-links of a plurality of sub-links of the composite link. For example, the processing circuitry 24 may be configured to determine the first subset and the second subset by determining for each sub-link of a plurality of sub-links of the composite link, whether said sub-link supports enabling the desired power saving state. If it is determined that said sub-link supports enabling the desired power saving state, the processing circuitry 24 may be configured to selectively trigger said sub-link to enable the desired power saving state and determine, after selectively triggering said sub-link to enable the desired power saving state, whether an exit latency for the composite link is below the latency threshold. If it is determined that the exit latency is below the latency threshold, the processing circuitry 24 may be configured to allocate said sub-link to the first subset. Otherwise, the processing circuitry 24 may allocate said sub-link to the second subset.

The first subset may comprise any number k≥1 of sub-links. The second subset may comprise any number p≥1 of sub-links.

The processing circuitry 24 is further configured to selectively trigger at least one sub-link of the first subset to enable the desired power saving state. For instance, the processing circuitry 24 may trigger any number q≥1 of sub-links (e.g., all sub-links) of the first subset to enable the desired power saving state.

The techniques described herein, such as with reference to apparatus 24, may provide an improvement of the power management based on a "higher resolved" testing of the hierarchy domain, i.e., they may provide a testing of individual sub-links or a subset of sub-links within a composite link of the hierarchy domain on whether an enablement of the desired power saving state is possible, in consideration of constraints of the composite link. This may lead to a higher number of sub-links with an enabled power saving state, thus, to a reduced overall power consumption of the PCIe system 200.

The processing circuitry 24 may in some examples further verify the compliance with other constraints. For instance, the processing circuitry 24 may be configured to determine whether an exit latency for the sub-link is above an exit latency for at least one further sub-link of the composite link upstream of the sub-link. The sub-link may be selectively triggered to enable the desired power saving state if it is determined that the exit latency for the sub-link is above the exit latency for the further sub-link.

In some examples, the processing circuitry 24 is configured to selectively trigger the further sub-link to disable the desired power saving state or a further power saving state if it is determined that the exit latency for the sub-link is below the exit latency for the further sub-link. The further sub-link may be a sub-link of the first subset, the second subset or any other subset of sub-links of the plurality of sub-links of the composite link. The processing circuitry 24 may, for instance, trigger a certain selection of upstream (further) sub-links (e.g., all upstream sub-links) to disable an enabled power saving state such that the exit latency for the sub-link is above the resulting exit latency for the further sub-link. Alternatively, the processing circuitry may trigger the sub-link to disable the desired power saving state.

In some examples, the apparatus 20 further comprises memory circuitry (e.g., storage circuitry 26) to store, for each sub-link of a plurality of sub-links of the composite link, an indication whether said sub-link has been triggered to enable or disable the desired power saving state.

In some examples, the processing circuitry 24 is further configured to determine that an exit latency of the composite link, with a third subset of sub-links having enabled a further power saving state, is below the latency threshold and that the third subset supports enabling the further power saving state and selectively trigger at least one sub-link of the third subset to enable the further power saving state.

The third subset may comprise any number r≥1 of sub-links. The third subset may comprise sub-links which are neither in the first nor the second subset and/or sub-links which are in the first or the second subset.

For instance, the processing circuitry 24 may verify the compliance with given constraints for lower or higher power saving states for further sub-links (and/or for the sub-link). For instance, if compliance with the constraints is not given for a certain sub-link having the desired power saving state, a lower power saving state (with a potentially lower exit latency) may be verified afterwards. The processing circuitry 24 may, for example, determine a configuration of the PCIe system 200 with some sub-links of the composite link having different power saving states enabled and, optionally, with other sub-links having no power saving state enabled. In this manner, the apparatus 20 may enable a determination of desirable configurations with heterogeneously enabled power saving states which may improve the power management of the PCIe system 200.

In some examples, the processing circuitry 24 is further configured to determine that a second composite PCIe link, terminating at the same PCIe root complex (of the PCIe system 200) like the composite link, lacks support for enabling a desired power saving state or an exit latency for the second composite link is above a second latency threshold. The processing circuitry 24 may be configured to determine that an exit latency of the second composite link, with a third (or fourth) subset of sub-links having enabled the desired power saving state and a fourth (or fifth) subset of sub-links having disabled the desired power saving state, is below the second latency threshold and that the third subset supports enabling the desired power saving state. The processing circuitry 24 may be configured to selectively trigger at least one sub-link of the third subset to enable the desired power saving state. Thus, the apparatus 20 may run its optimization on several composite links, preferably on as many composite links as possible to further decrease the power consumption of the PCIe system 200.

The apparatus 20 may be implemented by any software and/or hardware. In some examples, the apparatus 20 is implemented by firmware, e.g., of the computer system 100. In other words, the computer system 200 may comprise a firmware, such as a BIOS (Basic Input/Output System) or UEFI (Unified Extensible Firmware Interface), which may in turn comprise the apparatus 20 or device 20. In particular, the apparatus 20 or device 20 may correspond to the firmware, or to a partial functionality of the firmware, of the computer system 100. For example, the apparatus 20 or device 20 may be part of the BIOS or part of the UEFI of the computer system 100. The latter may be beneficial for an early initialization of the PCIe system 200, e.g., during boot of the computer system 100.

More details and aspects of the apparatus 20 are explained in connection with the proposed technique or one or more examples described above (e.g., with reference to FIG. 1a and FIG. 1b). The apparatus 20 may comprise one or more additional optional features corresponding to one or more aspects of the proposed technique, or one or more examples described above. In some examples, the composite link may correspond to the second composite link described with reference to FIG. 1a and FIG. 1b, and one or more functions applied to the second composite link by the apparatus 10 may be similarly applied to the composite link by the apparatus 20.

Figure 3A:
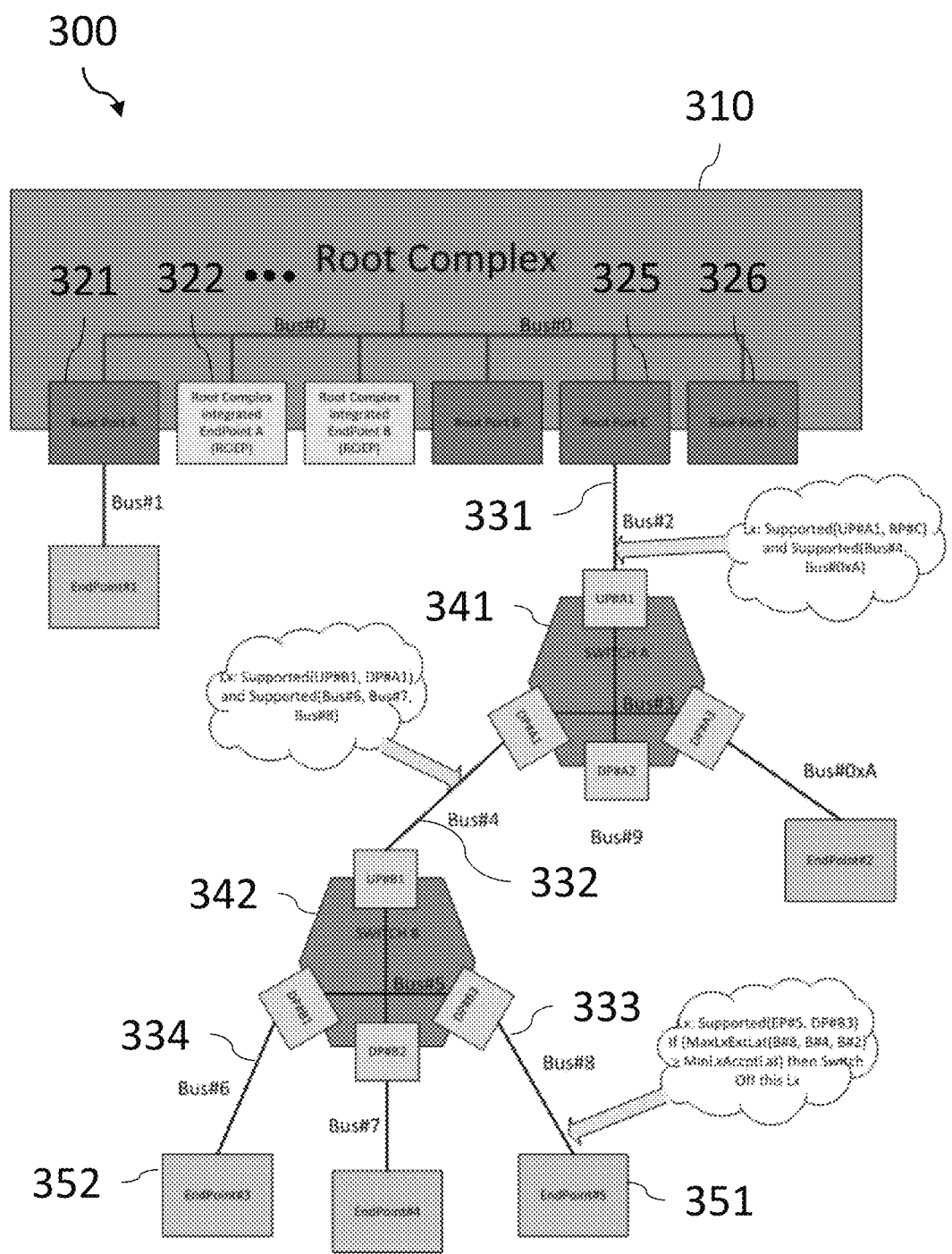
FIG. 3a, FIG. 3b, and FIG. 3c show an example of a PCIe system.
Figure 3B:
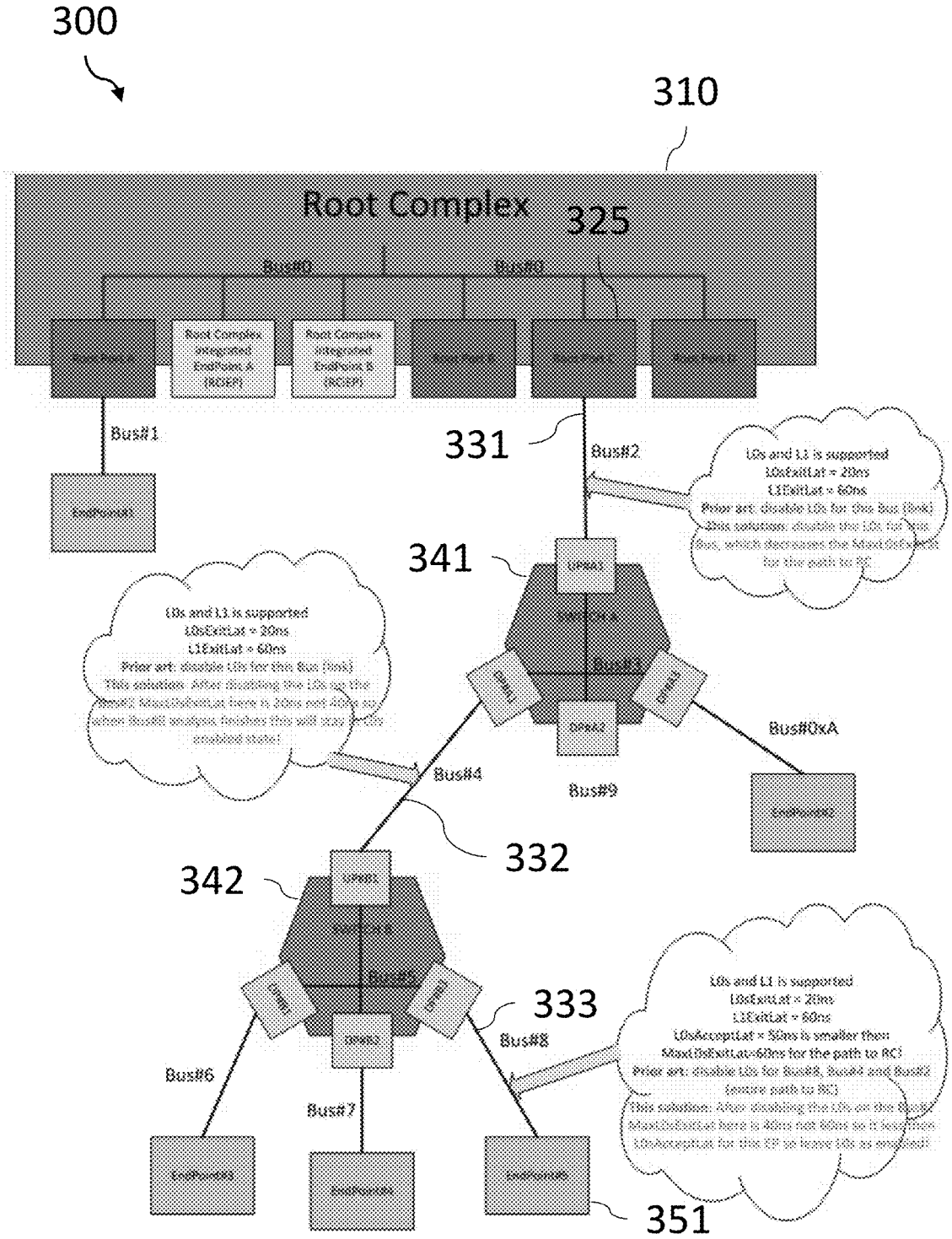
Figure 3C:
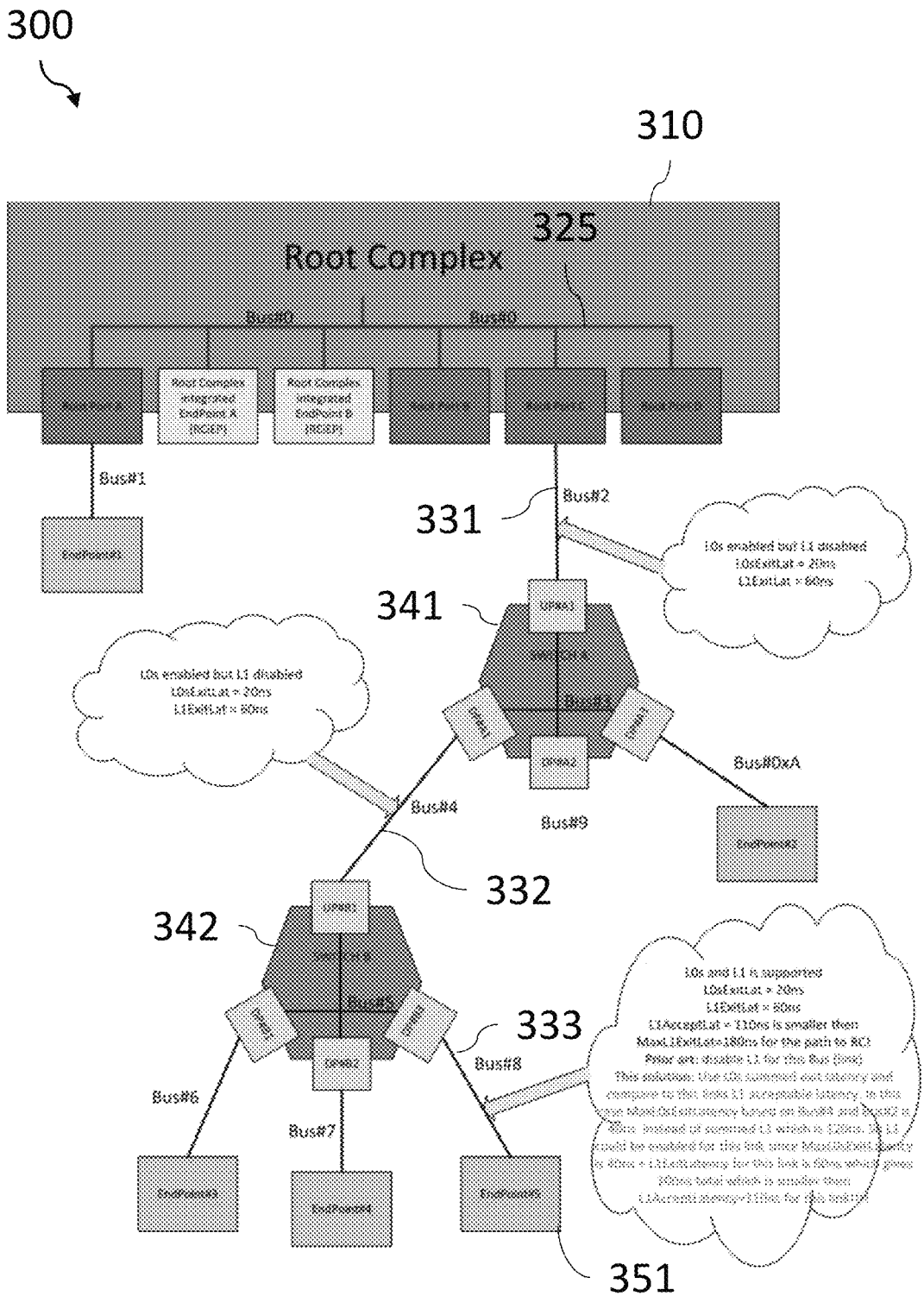

FIG. 3a to FIG. 3c show an example of a PCIe system 300. The PCIe system 300 comprises a root complex with PCIe root ports 321 to 326. Some root ports, e.g., root port 322, are coupled to a root complex integrated endpoint (RCiEP). Root port 325 is coupled via a first sub-link (bus) 331 to a three-port switch 341. One port of the switch 341 is coupled via a second sub-link 332 to another three-port switch 342. The switch 342 is coupled via a third sub-link 333 to an endpoint 351. The path from the endpoint 351 to the root port 325 including the sub-links 331, 332, 333 may be considered a composite link of a plurality of composite links of the PCIe system 300 (e.g., connected to the root complex 310).

Another port of the switch 342 is coupled via a fourth sub-link 334 to another endpoint 352. The path from the endpoint 352 to the root port 325 including the sub-links 335, 332, 333 may be considered a second composite link of the plurality of composite links. The second composite link terminates at the same root port 325 like the (first) composite link.

In the example shown in FIG. 3a, an apparatus as described herein (e.g., apparatus 10 or 20) may determine if an enablement of a (desired) power saving state Lx is supported at the sub-link 331 by determining whether an upstream port of the switch 341 (to which the sub-link 331 is connected), the root port 325 and adjacent sub-links (sub-link 332 and internal sub-link of the root complex 310) support the power saving state Lx. In this example, the apparatus may have determined that the enablement is supported.

In the example shown in FIG. 3a, the apparatus may determine if an enablement of the power saving state Lx is supported at the sub-link 332 by determining whether an upstream port of the switch 342 (to which the sub-link 332 is connected), a downstream port of the switch 341 (to which the sub-link 332 is connected) and adjacent downstream sub-links (e.g., sub-links 333 and 334) support the power saving state Lx. In this example, the apparatus may have determined that the enablement is supported.

In the example shown in FIG. 3a, the apparatus may determine if an enablement of the power saving state Lx is supported at the sub-link 333 by determining whether the endpoint 351 (to which the sub-link 333 is connected) and a downstream port of the switch 342 (to which the sub-link 333 is connected) support the power saving state Lx. In this example, the apparatus may have determined that the enablement is supported.

In the example shown in FIG. 3b, a power saving state Lx may be L0s. An exit latency (L0sExitLat) for sub-links 331, 332, 333 to transition from L0s to an active state may be 20 ns (nano-seconds), respectively. The apparatus may determine that an (overall) exit latency for the composite link is above a latency threshold. The exit latency for the composite link may be based on a sum of exit latencies (MaxL0sExitLat) for the sub-links 331, 332, 333, which would be 60 ns in the example of FIG. 3b. The latency threshold may be based on the maximal latency threshold (L0sAcceptLat) accepted by the endpoint 351. In the example of FIG. 3b, the threshold may be 50 ns.

A conventional power management system may, in response to determining that the exit latency for the composite link is above the latency threshold, trigger all sub-links 331, 332, 333 to disable L0s.

The apparatus as described herein is, in contrast, configured to determine that an exit latency of the composite link, with a first subset of sub-links having enabled the desired power saving state and a second subset of sub-links having disabled the desired power saving state, is below the latency threshold. In the example of FIG. 3b, the apparatus may determine that, with a first subset comprising sub-links 332 and 333 and a second subset comprising sub-link 331, the composite link has a permissible exit latency (below the threshold) of 40 ns. The apparatus is configured to selectively trigger at least one sub-link (e.g., sub-link 332) of the first subset to enable the desired power saving state and/or trigger at least one sub-link (e.g., sub-link 331) of the second subset to disable the desired power saving state.

In the example shown in FIG. 3c, the power saving state Lx may be L1. An exit latency (L1ExitLat) for sub-links 331, 332, 333 to transition from L1 to an active state may be 60 ns (nano-seconds), respectively. The apparatus may determine that an (overall) exit latency for the composite link with all sub-links having enabled L1 is above a latency threshold. The exit latency for the composite link may be based on a sum of exit latencies (MaxL1ExitLat) for the sub-links 331, 332, 333, which would be 180 ns in the example of FIG. 3c. The latency threshold may be based on the maximal latency threshold (L1AcceptLat) accepted by the endpoint 351. In the example of FIG. 3b, the threshold may be 110 ns.

A conventional power management system may, in response to determining that the exit latency for the composite link is above the latency threshold, trigger all sub-links 331, 332, 333 to disable L1.

The apparatus as described herein is, by contrast, configured to determine that an exit latency of the composite link, with a first subset of sub-links having enabled the desired power saving state and a second subset of sub-links having disabled the desired power saving state, is below the latency threshold. In the example of FIG. 3c, the apparatus may determine that that, with a first subset comprising sub-link 333 and a second subset comprising sub-links 331 and 332, the composite link has a permissible exit latency (below the threshold) of 110 ns. The apparatus is configured to selectively trigger at least one sub-link (e.g., sub-link 333) of the first subset to enable the desired power saving state and/or trigger at least one sub-link (e.g., sub-link 331) of the second subset to disable the desired power saving state.

Further, the apparatus may be configured to determine that an exit latency of the composite link, with a third subset of sub-links comprising sub-links 331 and 332 having enabled a further power saving state (e.g., L0s), is below the latency threshold. The apparatus may be configured to selectively trigger at least one sub-link (e.g., sub-link 331) of the third subset to enable the further power saving state. A resulting exit latency for the composite link may be 100 ns if sub-links 331 and 332 have L0s enabled (20 ns, respectively) and sub-link 333 has L1 enabled (60 ns).

Figure 4:
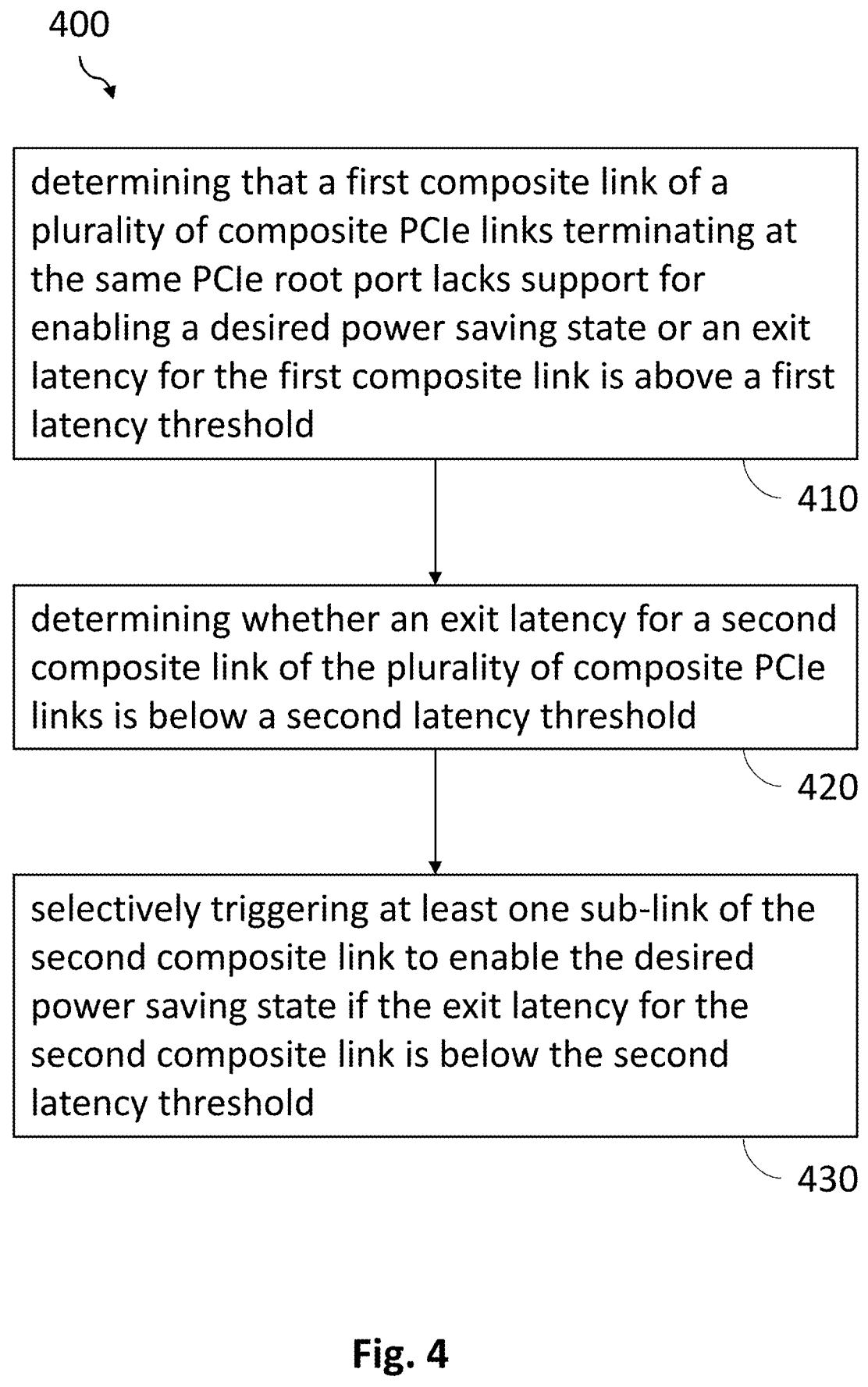

FIG. 4 shows a flowchart of an example of a method 400. For example, the method 400 may be performed by processing circuitry, e.g., the processing circuitry 14. The method 400 comprises determining 410 that a first composite link of a plurality of composite peripheral component interconnect express (PCIe) links terminating at the same PCIe root port lacks support for enabling a desired power saving state or an exit latency for the first composite link is above a first latency threshold. The method 400 further comprises determining 420 whether an exit latency for a second composite link of the plurality of composite PCIe links is below a second latency threshold and selectively triggering 430 at least one sub-link of the second composite link to enable the desired power saving state if the exit latency for the second composite link is below the second latency threshold.

The method 400 may improve a power management of a PCIe system based on a "higher resolved" testing of a hierarchy domain, i.e., by providing a testing of individual sub-links or a subset of sub-links within a composite link of the hierarchy domain on whether an enablement of the desired power saving state is possible, in consideration of constraints of the composite link. This may lead to a higher number of sub-links with an enabled power saving state, thus, to a reduced overall power consumption of the PCIe system.

More details and aspects of the method 400 are explained in connection with the proposed technique or one or more examples described above (e.g., with reference to FIG. 1a and FIG. 1b). The method 400 may comprise one or more additional optional features corresponding to one or more aspects of the proposed technique, or one or more examples described above.

In some examples, the method 400 comprises selectively triggering at least one of the sub-link and a further sub-link of the second composite link to disable the desired power saving state or a further power saving state if it is determined that the exit latency is above the second latency threshold.

In some examples, the method 400 comprises determining whether an updated exit latency for the second composite link is below the second latency threshold after selectively triggering the sub-link to enable the desired power saving state and selectively triggering the sub-link to disable the desired power saving state if it is determined that the updated exit latency is above the second latency threshold.

In some examples, the method 400 comprises selectively triggering a further sub-link of the second composite link to enable the desired power saving state if it is determined that the updated exit latency is below the second latency threshold.

FIG. 5 shows a flowchart of an example of a method 500 For example, the method 400 may be performed by processing circuitry, e.g., the processing circuitry 24. The method 500 comprises determining 510 that a composite PCIe link lacks support for enabling a desired power saving state or an exit latency for the composite link is above a latency threshold. The method 500 further comprises determining 520 that an exit latency of the composite link, with a first subset of sub-links having enabled the desired power saving state and a second subset of sub-links having disabled the desired power saving state, is below the latency threshold and that the first subset supports enabling the desired power saving state. The method 500 further comprises selectively triggering 530 at least one sub-link of the first subset to enable the desired power saving state.

The method 500 may improve a power management of a PCIe system based on a "higher resolved" testing of a hierarchy domain, i.e., by providing a testing of individual sub-links or a subset of sub-links within a composite link of the hierarchy domain on whether an enablement of the desired power saving state is possible, in consideration of constraints of the composite link. This may lead to a higher number of sub-links with an enabled power saving state, thus, to a reduced overall power consumption of the PCIe system.

More details and aspects of the method 500 are explained in connection with the proposed technique or one or more examples described above (e.g., with reference to FIG. 2a and FIG. 2b). The method 500 may comprise one or more additional optional features corresponding to one or more aspects of the proposed technique, or one or more examples described above.

In some examples, the threshold is based on a maximal exit latency accepted by an endpoint of the composite link.

In some examples, the method 500 further comprises determining whether an exit latency for the sub-link is above an exit latency for at least one further sub-link of the composite link upstream of the sub-link. Selectively triggering the sub-link to enable the de-sired power saving state may be performed if it is determined that the exit latency for the sub-link is above the exit latency for the further sub-link.

In some examples, the method 500 further comprises selectively triggering the further sub-link to disable the desired power saving state or a further power saving state if it is determined that the exit latency for the sub-link is below the exit latency for the further sub-link.

Further examples may relate to a non-transitory machine-readable storage medium including program code, which is configured to, when executed, cause a machine to perform a method as described herein, such as method 400 or 500.

FIG. 6*a* to FIG. 6*d* show flowcharts of sub-methods 600-1, 600-2, 600-3, 600-4, respectively, for performance by a processing circuitry. A method as described herein may comprise one or more of the sub-methods 600-1 to 600-4. The method may be performed with respect to a PCIe system, e.g., the PCIe system 200 or 300 as shown in connection with FIG. 1*c* or FIG. 3, respectively.

For the flowcharts shown in FIG. 6*a* to FIG. 6*d*, the following denotation is introduced. Root Complex is referenced as RC. Root Ports are referenced as RP. Switch or Bridge Upstream Ports are referenced as USP or UP. Switch or Bridge Downstream Ports are referenced as DSP or DP. Root Complex integrated End Point is referenced as RCiEP. End Point is referenced as EP.

The method may enable an improvement or optimization of ASPM settings in a sub-link domain. That means that setting any power saving state for a sub-link, both sides of the sub-link may be considered. In example shown in FIG. 6*a* to FIG. 6*d*, all settings and analysis may be considered for a sub-link which includes settings and analysis for devices on both sides of that sub-link.

Additionally, for the whole path (composite link) between a given endpoint and Root Complex, an Lx exit latency may be analyzed and concerned with an Lx Exit Latency accepted by the endpoint. RCiEPs may be disregarded by the method since its sub-links are integrated into silicon with the Root Complex.

Input register fields used by the method may comprise: ASPM support (Link Cap) which may define which Lx sub-states (power saving states) are supported by a sub-link, L0s Exit Latency (Link Cap) which may define the range of latencies in ns that a port supports when exiting the L0s state, L1 Exit Latency (Link Cap) may define the range of latencies in ns that a port supports when exiting the L1 state, and EndPoint Lx Acceptable Latency (Device Cap) may define an acceptable latency that an Endpoint can withstand due to the transition from L1 state to the L0 state.

Output register fields used by the method may comprise: ASPM Control (Link Control) which may set the current Lx sub-state for each sub-link.

Additionally, implementing the method may be based on variables such as TotalPathLxExit-Latency which is a Summed exit latency for given Lx state determined for all upper (upstream) intermediate sub-links on the path to Root Complex. If L1 is checked, this internal variable is TotalPathL1ExitLatency and analogically TotalPathL0sExitLatency for L0s. Another variable may serve for storing an indication that given sub-link has been configured (has an enabled or disabled power saving state). For instance, for each sub-link of the plurality of composite links, an indication whether said sub-link has been triggered to enable or disable the desired power saving state.

This may help to avoid back and forth changes when a recursive algorithm of the method comes back to this sub-link. For optimization runs where EP doesn't comply with its Acceptable Latency, the method may comprise storing currently calculated Total Latencies in case where optimization won't work, and the calculated Total Latencies need to be restored.

The method comprises separate analyses for L0s and L1 power saving states, as in the example shown in FIG. 6*a* to FIG. 6*d*, L1 determination is based on results of L0s analysis. So L0s verification may be performed before L1 verification. A difference between L0s and L1 verification may be that, if for any intermediate link on the path to RC the L1 is to be disabled, and if L0s is enabled, the L0s Maximum Exit Latency for that link may be considered for further L1 exit latency calculations for End Points when checking whether Maximum L1 Exit Latency is within the Acceptable Exit Latency range.

The sub-method 600-1 may be considered a main loop of the method. The sub-method 600-2 may be considered an Lx disabling procedure. The sub-method 600-3 may be considered an L0s endpoint programming procedure. And the sub-method 600-4 may be considered an L1 endpoint programming procedure.

The processing circuitry (performing the method) may determine that a first composite link of a plurality of composite PCIe links terminating at the same PCIe root port lacks support for enabling a desired power saving state Lx or an exit latency for the first composite link is above a first latency threshold (not shown in FIG. 6*a* to FIG. 6*d*). The processing circuitry may determine whether an exit latency for a second composite link of the plurality of composite PCIe links is below a second latency threshold and selectively trigger at least one sub-link of the second composite link to enable the desired power saving state if the exit latency for the second composite link is below the second latency threshold.

The processing circuitry may selectively trigger iteratively, for each sub-link of a plurality of sub-links of the second composite link, said sub-link to enable the desired power saving state. The processing circuitry may selectively trigger iteratively, for each power saving state (e.g., L0s and L1) of a plurality of power saving states comprising the desired power saving state, the sub-link to enable said power saving state. The sub-method 600-1 may first be run for L0s and subsequently for L1.

In block 601 of sub-method 600-1, the processing circuitry iteratively selects one sub-link after another by going through all downstream ports and root ports of the PCIe system (for each DP or RP link). In block 602, the processing circuitry determines whether the selected sub-link is connected to an upstream port or an endpoint (USP link or EP link?). In case of the latter, the sub-method 600-3 or 600-4 may be initiated in block 603, depending on whether L0s or L1 is considered (run EP programming procedure for this link).

In block 604, the processing circuitry determines whether an indication is stored that the selected sub-link has the desired power saving state enabled (Has Lx been configured?). If so, the sub-link may be skipped for further changes in its settings and the processing circuitry selects the next sub-link (e.g., further sub-link) in block 605 of a currently selected switch (move down the switch to its first DP link). In block 606, the processing circuitry determines, in response to selecting the next sub-link, whether the next sub-link is connected to a DP or RP (DP or RP?). If it is an RP, in block 607, the processing circuitry determines whether the next sub-link is connected to the last RP (last RP?). If so, in block 608, the method is terminated. If not, the processing circuitry resumes to block 601. If it is an DP, in block 609, the processing circuitry determines whether the next sub-link is connected to the last DP of a currently selected switch (Last DP in switch?). If so, in block 610, the processing circuitry selects the next sub-link of an upstream switch (move up in hierarchy to next DP in upper switch). After block 610, the processing circuitry resumes to block 601.

If the sub-link has not no indication that the desired power saving state is enabled, in block 611, the processing circuitry determines s whether the selected sub-link supports enabling the desired power saving state and whether an exit latency for the sub-link is above an exit latency for at least one further sub-link of the second composite link upstream of the sub-link (is Lx supported? And is Link. ExitLatency>LxExitLatency). If so, in block 612, the sub-link is selectively triggered to enable the desired power saving state (enable Lx for that link). If not, in block 613, the sub-link is selectively triggered to disable the desired power saving state. The sub-method 600-2, in block 614, may be initiated after block 613.

After block 612, the processing circuitry updates the exit latency for the composite link in block 615 by considering the new exit latency of the sub-link and an exit latency of a switch connected to the sub-link (add link's Lx latency and internal switch's latency to the TotalPath-LxExitLatency (patch to RC)). After block 615, the processing circuitry resumes to block 605. In block 616 of sub-method 600-2 shown in FIG. 6b, the processing circuitry determines (inter-mediate) further sub-links upstream of the sub-link (for requested link, determine all intermediate links on the path to RC). After block 616, in block 617, the processing circuitry selects each of the further sub-links (for each intermediate (int.) link on the path to RC: go bottom up) and, in block 618, trigger the selected further sub-link to disable Lx (disable Lx for this intermediate link). In block 619, the processing circuitry determines whether Lx is L0s or L1 (running for L0s or L1?). If Lx is L0s,—in block 620, the processing circuitry updates the exit latency for the second composite link (subtract intermediate Link's L0s latency from TotalPathL0sExitLatency (path to RC)).—

If Lx is L1, in block 621, the processing circuitry determines whether the intermediate sub-link has L0s enabled (was L0s enabled for this int. link?) If yes, in block 622, the processing circuitry updates the exit latency for the com-posite link (add intermediate link's L0s latency to the TotalPathL1ExitLatency (path to RC)). The latter may allow taking into consideration the L0s exit latency for L1 calcu-lations if L1 is to be disabled for the intermediate link. After block 622, the processing circuitry further updates, in block 623, the exit latency for the composite link (subtract inter-mediate Link's L1 latency from TotalPathL1ExitLatency (path to RC)). If L0s has not been enabled for the interme-diate sub-link, the processing circuitry resumes to block 623.

After block 623 or 620, the processing circuitry deter-mines in block 624 whether the intermediate link is the most upstream intermediate link (last int. link on path to RC). If not, the processing circuitry resumes to block 617. If so, in block 625, the processing circuitry determines whether the intermediate link is connected to EP or USP (is this disabling for EP or USP int. link?). If it is connected to EP, the processing circuitry resumes to the sub-method 600-1. If it is connected to USP, the processing circuitry selects in block 626 the next intermediate link of the switch (move down the switch to its first DP link) and resume to the sub-method 600-1.

Figure 6A:
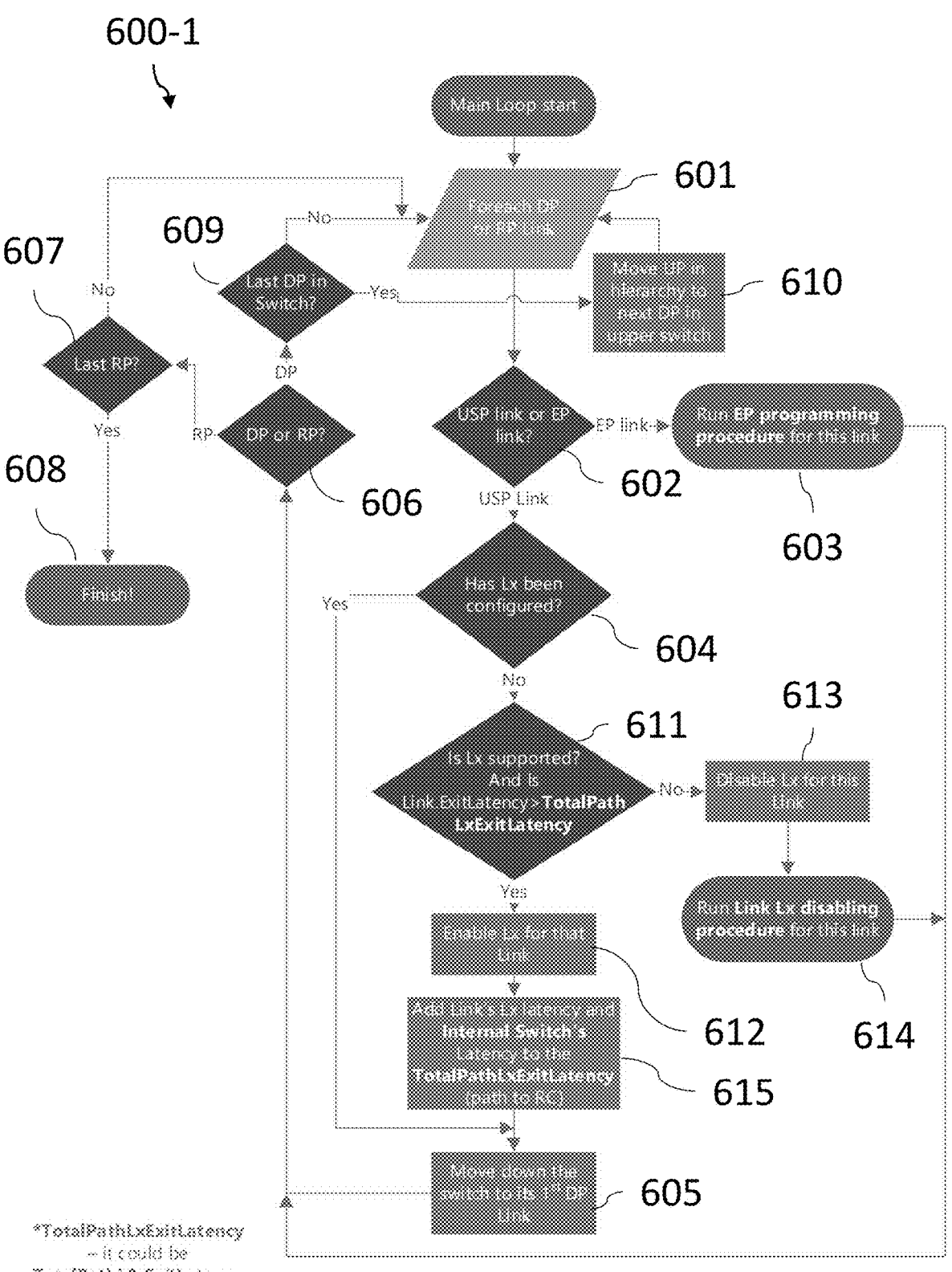
FIG. 6a to FIG. 6d show flowcharts of an example of a method comprising four sub-methods.
Figure 6B:
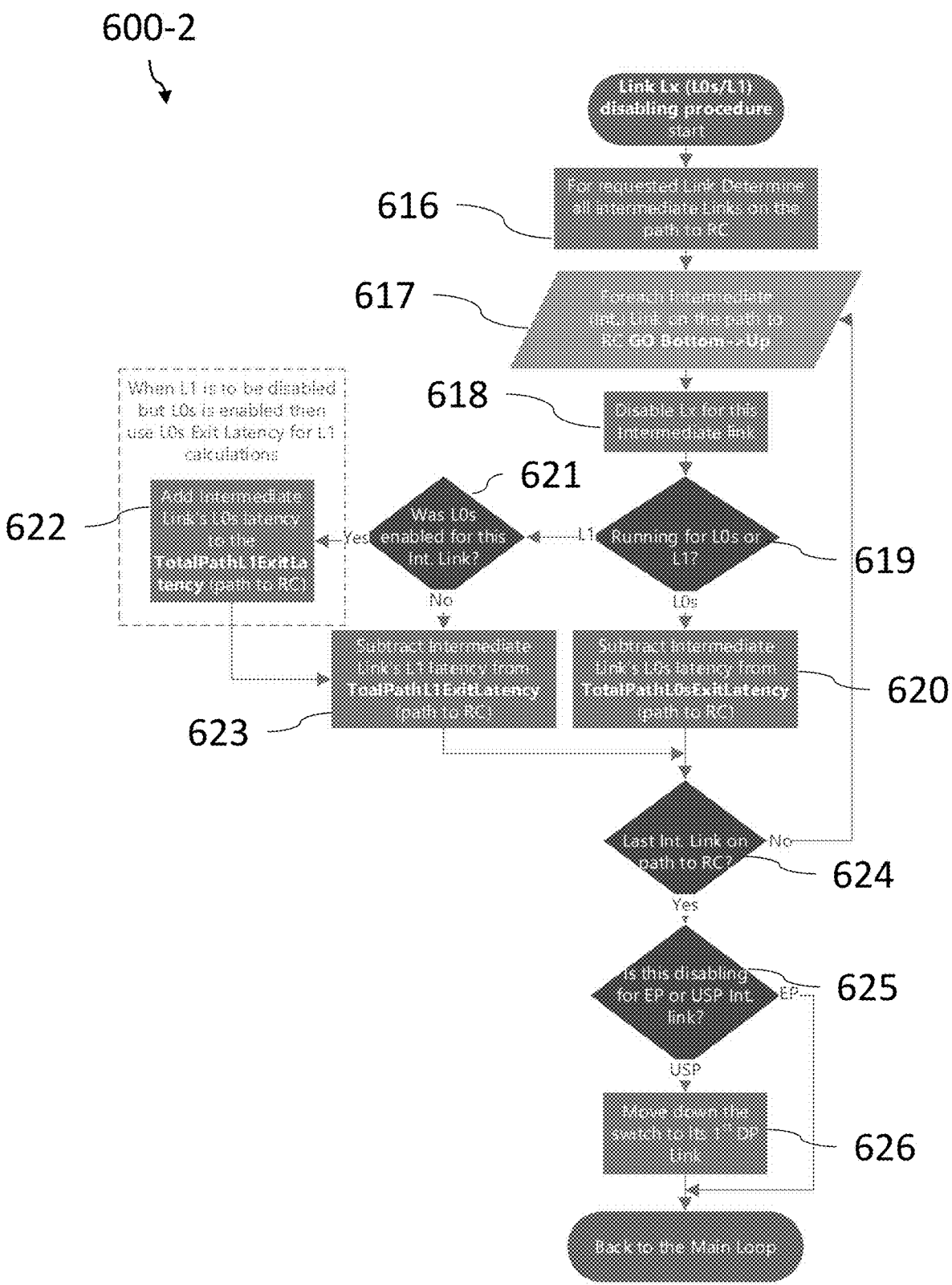
Figure 6C:
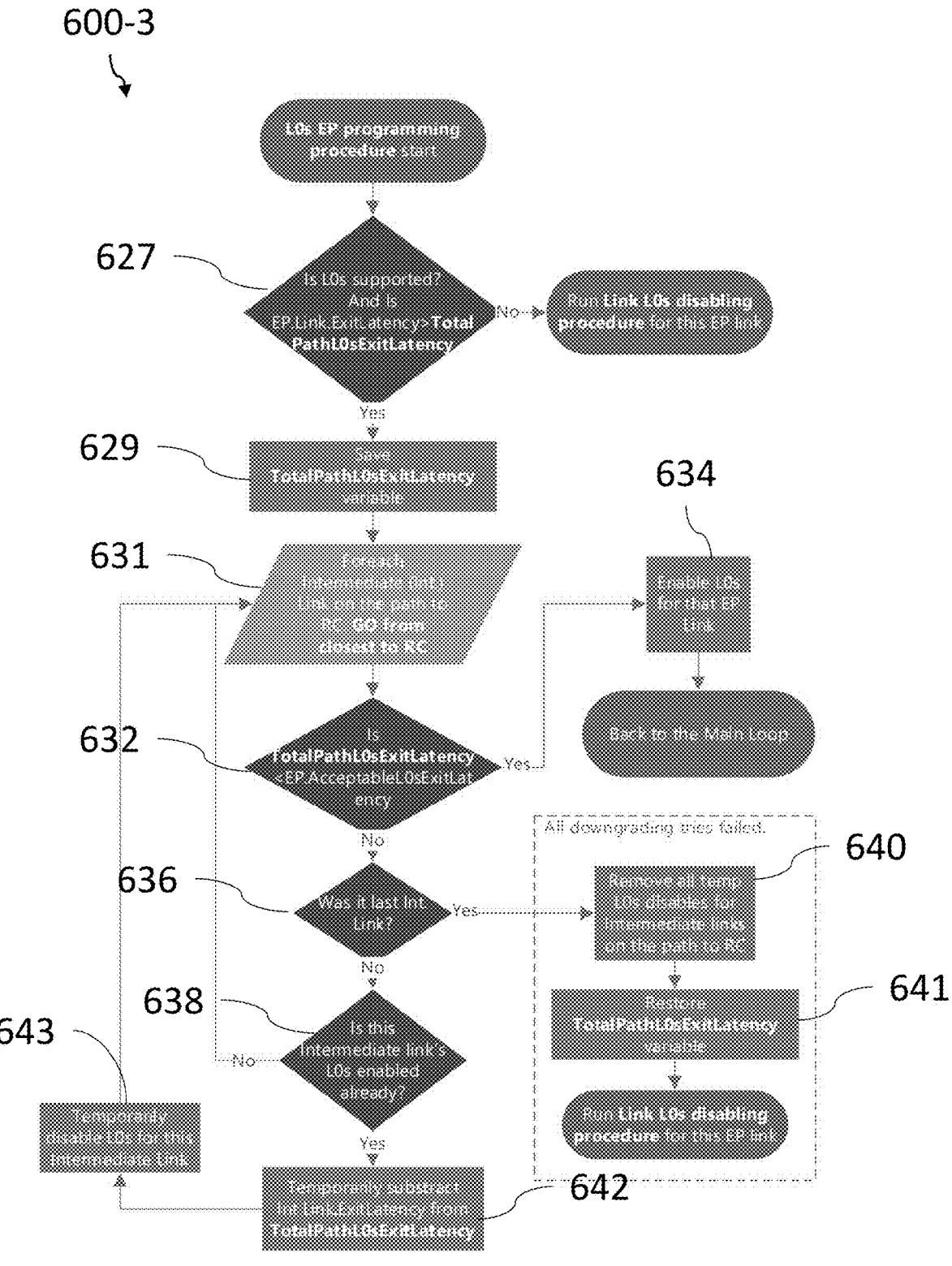
Figure 6D:
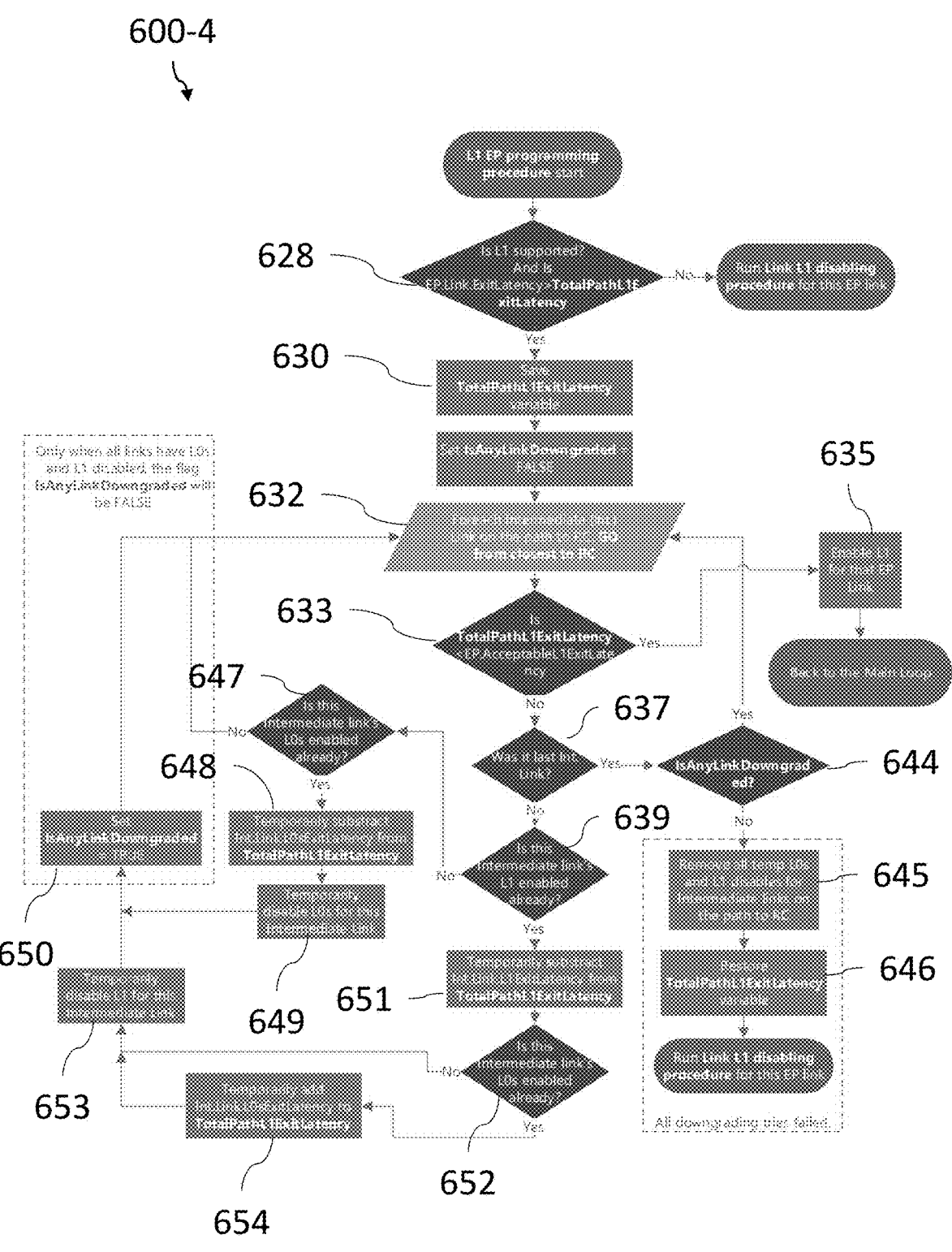

In block 627 of sub-method 600-3 shown in FIG. 6c and in block 628 of sub-method 600-4 shown in FIG. 6d, the processing circuitry determines whether Lx (L0s or L1, respectively) is supported for the selected sub-link and whether the exit latency for sub-link is above an exit latency for at least one further sub-link upstream to the sub-link (Is L0s/L1 supported and is EP.Link.Exit-Latency>TotalPathL0s/L1ExitLatency). If so, in block 629 of sub-method 600-3 and in step 630 of sub-method 600-4, the exit latency for the second composite link is updated (save TotalPathL0s/L1ExitLatency). If not, sub-method 600-2 is initiated for disabling Lx for the sub-link. In sub-method 600-4, in step 630, the processing circuitry further sets a variable "IsAnyLinkDowngraded" to False (set is AnyLinkDowngraded=FALSE).

In block 631 of sub-method 600-3 and in block 632 of sub-method 600-4, the processing circuitry selects each of (intermediate) further sub-links (upstream to the sub-link) (for each intermediate (int.) link on the path to RC, go from closest to RC). In block 632 of sub-method 600-3 and in block 633 of sub-method 600-4, the processing circuitry determines whether the updated exit latency is below the second threshold (is TotalPathL0s/L1ExitLatency<EP.Ac-ceptableL0s/L1ExitLatency). If so, in block 634 of sub-method 600-3 and in block 635 of sub-method 600-4, Lx is enabled for the selected intermediate sub-link (enable L0/L1 for that EP link If not, in block 636 of sub-method 600-3 and in block 637 of sub-method 600-4, the processing circuitry determines whether the intermediate link is the last intermediate link to be checked (was it last int. link?). If not, in block 638 of sub-method 600-3 and in block 639 of sub-method 600-4, the processing circuitry determines whether the selected intermediate link has Lx enabled (is this intermediate link's L0/L1 enabled already?).

If it is the last intermediate link, in block 640 of sub-method 600-3, the processing circuitry removes potential indications of L0s disables stored in the memory circuitry (remove all temporary L0s disables for intermediate links on the path to RC). After block 640, the processing circuitry updates the exit latency for the composite link (restore TotalPathL0sExitLatency) and resume to sub-method 600-2.

If L0s is not enabled, the processing circuitry resumes to block 631. If L0s is enabled, in block 642, the processing circuitry determines an updated exit latency for the com-posite link by subtracting the exit latency for the interme-diate link (temporarily subtract int.LinkExit-Latency from TotalPathL0sExitLatency). After block 642, the processing circuitry triggers the intermediate link to disable L0s in block 643 (temporarily disable L0s for this intermediate link). After block 643, the processing circuitry resumes to block 631.

If it is the last intermediate link, in block 644 of sub-method 600-4, the processing circuitry determines whether the variable "IsAnyLinkDowngraded" is False. If not, the processing circuitry resumes to block 632. If so, in block 645, the processing circuitry removes potential indications of L0s and L1 disables stored in the memory circuitry (remove all temp L0s and L1 disables for intermediate links on the path to RC). In block 646, the processing circuitry updates the exit latency for the composite link (restore TotalPathL1ExitLatency variable) and resumes to sub-method 600-2. The latter may enable a restart when down-grading (disabling) tries failed.

If L1 is not enabled, in block 647, the processing circuitry determines whether L0s is enabled for the intermediate link (is this intermediate link's L0s enabled already?) If not, the processing circuitry resumes to block 632. If so, in block 648, the processing circuitry updates the exit latency for the composite link by subtracting the L0s exit latency for the intermediate link (temporarily subtract Int. LinkL0sExitLatency from TotalPathL1ExitLatency). In block 649, the processing circuitry triggers the intermediate link to disable L0s (temporarily disable L0s for this inter-mediate link). After block 649, in block 650, the processing circuitry sets the variable IsAnyLinkDowngraded to True (set IsAnyLinkDowngraded=TRUE) and resumes to block 632. Block 650 may ensure that the variable (flag) IsA-nyLinkDowngraded is only False when all sub-links of the composite link have L0s and L1 disabled.

If L1 is enabled, in block 652, the processing circuitry determines whether the intermediate link has L0s enabled (is this intermediate link's L0s enabled already?). If not, in block 653, the processing circuitry triggers the intermediate link to disable L1 (temporarily disable L1 for this interme-diate link) and resume to block 650. If so, in block 654, the processing circuitry updates the exit latency for the com-posite link by adding the L0s exit latency of the intermediate link (temporarily add Int. LinkL0sExitLatency to TotalPathL1ExitLatency) and resume to block 653.

The sub-methods 600-1 to 600-4 may improve a power management of a PCIe system. This may lead to a higher number of sub-links with an enabled power saving state, thus, to a reduced overall power consumption of the PCIe system.

Examples may further be or relate to a (computer) pro-gram including a program code to execute one or more of the above methods when the program is executed on a computer, processor or other programmable hardware component. Thus, steps, operations or processes of different ones of the methods described above may also be executed by pro-grammed computers, processors or other programmable hardware components. Examples may also cover program storage devices, such as digital data storage media, which are machine-, processor- or computer-readable and encode and/or contain machine-executable, processor-executable or com-puter-executable programs and instructions. Program storage devices may include or be digital storage devices, magnetic storage media such as magnetic disks and mag-netic tapes, hard disk drives, or optically readable digital data storage media, for example. Other examples may also include computers, processors, control units, (field) pro-grammable logic arrays ((F) PLAs), (field) programmable gate arrays ((F) PGAs), graphics processor units (GPU), application-specific integrated circuits (ASICs), integrated circuits (ICs) or system-on-a-chip (SoCs) systems pro-grammed to execute the steps of the methods described above.

It is further understood that the disclosure of several steps, processes, operations or functions disclosed in the descrip-tion or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a prop-erty or a functional feature of a corresponding device or a corresponding system.

In the following, some examples of the proposed concept are presented:

An example (e.g., example 1) relates to an apparatus comprising interface circuitry and processing circuitry, the processing circuitry being configured to determine that a first composite link of a plurality of composite peripheral component interconnect express (PCIe) links terminating at the same PCIe root port lacks support for enabling a desired power saving state or an exit latency for the first composite link is above a first latency threshold, determine whether an exit latency for a second composite link of the plurality of composite PCIe links is below a second latency threshold, and selectively trigger at least one sub-link of the second composite link to enable the desired power saving state if the exit latency for the second composite link is below the second latency threshold.

Another example (e.g., example 2) relates to a previous example (e.g., example 1) or to any other example, further comprising that the first threshold is based on a maximal exit latency accepted by an endpoint of the first composite link, and wherein the second latency threshold is based on a maximal exit latency accepted by an endpoint of the second composite link.

Another example (e.g., example 3) relates to a previous example (e.g., one of the examples 1 or 2) or to any other example, further comprising that the processing circuitry is configured to selectively trigger at least one of the sub-link and a further sub-link of the second composite link to disable the desired power saving state or a further power saving state if it is determined that the exit latency is above the second latency threshold.

Another example (e.g., example 4) relates to a previous example (e.g., one of the examples 1 to 3) or to any other example, further comprising that the processing circuitry is configured to determine whether an updated exit latency for the second composite link is below the second latency threshold after selectively triggering the sub-link to enable the desired power saving state, and selectively trigger the sub-link to disable the desired power saving state if it is determined that the updated exit latency is above the second latency threshold.

Another example (e.g., example 5) relates to a previous example (e.g., example 4) or to any other example, further comprising that the processing circuitry is configured to selectively trigger a further sub-link of the second composite link to enable the desired power saving state if it is deter-mined that the updated exit latency is below the second latency threshold.

Another example (e.g., example 6) relates to a previous example (e.g., one of the examples 4 or 5) or to any other example, further comprising that the processing circuitry is configured to selectively trigger the sub-link or the further sub-link to enable a further power saving state if it is determined that the updated exit latency is below the second latency threshold.

Another example (e.g., example 7) relates to a previous example (e.g., one of the examples 1 to 6) or to any other example, further comprising that the processing circuitry is configured to determine whether the sub-link supports enabling the desired power saving state, wherein the sub-link is selectively triggered to enable the desired power saving state if it is determined that the sub-link supports enabling the desired power saving state.

Another example (e.g., example 8) relates to a previous example (e.g., one of the examples 1 to 7) or to any other example, further comprising that the processing circuitry is configured to determine whether an exit latency for the sub-link is above an exit latency for at least one further sub-link of the second composite link upstream of the sub-link, wherein the sub-link is selectively triggered to enable the desired power saving state if it is determined that the exit latency for the sub-link is above the exit latency for the further sub-link.

Another example (e.g., example 9) relates to a previous example (e.g., example 8) or to any other example, further comprising that the processing circuitry is configured to selectively trigger the further sub-link to disable the desired power saving state or a further power saving state if it is determined that the exit latency for the sub-link is below the exit latency for the further sub-link.

Another example (e.g., example 10) relates to a previous example (e.g., one of the examples 1 to 9) or to any other example, further comprising that the exit latency for the second composite link is based on a sum of exit latencies for a plurality of sub-links of the second composite link.

Another example (e.g., example 11) relates to a previous example (e.g., example 10) or to any other example, further comprising that the exit latency for the second composite link is further based on an exit latency for a switch or bridge connected to the plurality of sub-links.

Another example (e.g., example 12) relates to a previous example (e.g., one of the examples 1 to 11) or to any other example, further comprising that the processing circuitry is configured to selectively trigger iteratively, for each sub-link of a plurality of sub-links of the second composite link, said sub-link to enable the desired power saving state, determine, in each iteration, whether an updated exit latency for the second composite link is below the second threshold after selectively triggering said sub-link to enable the desired power saving, and selectively trigger said sub-link to disable the desired power saving state if it is determined that the updated exit latency is above the second latency threshold.

Another example (e.g., example 13) relates to a previous example (e.g., example 12) or to any other example, further comprising that the processing circuitry is configured to determine, in each iteration, whether an exit latency for said sub-link is above an exit latency for at least one further sub-link of the plurality of sub-links upstream to said sub-link, and selectively trigger at least one of said sub-link and the further sub-link to disable the desired power saving state or a further power saving state if it is determined that the exit latency for the sub-link is below the exit latency for the further sub-link.

Another example (e.g., example 14) relates to a previous example (e.g., one of the examples 12 or 13) or to any other example, further comprising that the processing circuitry is configured to start the iterative determination at a sub-link of the plurality of sub-links which is connected to an endpoint of the second composite link.

Another example (e.g., example 15) relates to a previous example (e.g., one of the examples 12 to 14) or to any other example, further comprising that the processing circuitry is configured to perform the iterative determination by selecting, after each iteration, a subsequent sub-link of the plurality of sub-links which is upstream to said sub-link.

Another example (e.g., example 16) relates to a previous example (e.g., one of the examples 1 to 15) or to any other example, further comprising memory circuitry to store, for each sub-link of the plurality of composite links, an indication whether said sub-link has been triggered to enable or disable the desired power saving state.

Another example (e.g., example 17) relates to a previous example (e.g., one of the examples 1 to 16) or to any other example, further comprising that the processing circuitry is configured to selectively trigger iteratively, for each power saving state of a plurality of power saving states comprising the desired power saving state, the sub-link to enable said power saving state, determine, in each iteration, whether an updated exit latency for the second composite link is below the second threshold after selectively triggering said sub-link to enable said power saving state, and selectively trigger said sub-link to disable said power saving state if it is determined that the updated exit latency is above the second latency threshold.

Another example (e.g., example 18) relates to a previous example (e.g., one of the examples 1 to 17) or to any other example, further comprising that the processing circuitry is configured to determine, for each composite link of the plurality of composite links, whether a respective exit latency is below a respective latency threshold, and selectively trigger at least one sub-link of said composite link to enable the desired power saving state, if it is determined the respective exit latency for said composite link is below the respective latency threshold.

Another example (e.g., example 19) relates to a previous example (e.g., one of the examples 1 to 18) or to any other example, further comprising that the processing circuitry is configured to determine, for each composite link of a plurality of composite PCIe links terminating at the same PCIe root complex comprising the PCIe root port, whether a respective exit latency is below a respective latency threshold, and selectively trigger at least one respective sub-link of said composite link to enable the desired power saving state, if it is determined the exit latency for said composite link is below the respective latency threshold.

Another example (e.g., example 20) relates to a previous example (e.g., one of the examples 1 to 19) or to any other example, further comprising that the apparatus is implemented by firmware.

An example (e.g., example 21) relates to an apparatus comprising interface circuitry and processing circuitry, the processing circuitry being configured to determine that a composite peripheral component interconnect express (PCIe) link lacks support for enabling a desired power saving state or an exit latency for the composite link is above a latency threshold, determine that an exit latency of the composite link, with a first subset of sub-links having enabled the desired power saving state and a second subset of sub-links having disabled the desired power saving state, is below the latency threshold and that the first subset supports enabling the desired power saving state, and selectively trigger at least one sub-link of the first subset to enable the desired power saving state.

Another example (e.g., example 22) relates to a previous example (e.g., example 21) or to any other example, further comprising that the threshold is based on a maximal exit latency accepted by an endpoint of the composite link.

Another example (e.g., example 23) relates to a previous example (e.g., one of the examples 21 or 22) or to any other example, further comprising that the processing circuitry is configured to determine whether an exit latency for the sub-link is above an exit latency for at least one further sub-link of the composite link upstream of the sub-link, wherein the sub-link is selectively triggered to enable the desired power saving state if it is determined that the exit latency for the sub-link is above the exit latency for the further sub-link.

Another example (e.g., example 24) relates to a previous example (e.g., example 23) or to any other example, further comprising that the processing circuitry is configured to selectively trigger the further sub-link to disable the desired power saving state or a further power saving state if it is determined that the exit latency for the sub-link is below the exit latency for the further sub-link.

Another example (e.g., example 25) relates to a previous example (e.g., one of the examples 21 to 24) or to any other example, further comprising that the exit latency for the composite link is based on a sum of exit latencies for a plurality of sub-links of the second composite link.

Another example (e.g., example 26) relates to a previous example (e.g., example 25) or to any other example, further comprising that the exit latency for the composite link is further based on an exit latency for a switch or bridge connected to the plurality of sub-links.

Another example (e.g., example 27) relates to a previous example (e.g., one of the examples 21 to 26) or to any other example, further comprising that the processing circuitry is configured to determine the first subset and the second subset by determining for each sub-link of a plurality of sub-links of the composite link, whether said sub-link supports enabling the desired power saving state, if it is determined that said sub-link supports enabling the desired power saving state, selectively triggering said sub-link to enable the desired power saving state, determining, after selectively triggering said sub-link to enable the desired power saving state, whether an exit latency for the composite link is below the latency threshold, if it is determined that the exit latency is below the latency threshold, allocating said sub-link to the first subset.

Another example (e.g., example 28) relates to a previous example (e.g., one of the examples 21 to 27) or to any other example, further comprising memory circuitry to store, for each sub-link of a plurality of sub-links of the composite link, an indication whether said sub-link has been triggered to enable or disable the desired power saving state.

Another example (e.g., example 29) relates to a previous example (e.g., one of the examples 21 to 28) or to any other example, further comprising that the processing circuitry is configured to determine that an exit latency of the composite link, with a third subset of sub-links having enabled a further power saving state, is below the latency threshold and that the third subset supports enabling the further power saving state, and selectively trigger at least one sub-link of the third subset to enable the further power saving state.

Another example (e.g., example 30) relates to a previous example (e.g., one of the examples 21 to 29) or to any other example, further comprising that the processing circuitry is configured to determine that a second composite PCIe link, terminating at the same PCIe root complex like the composite link, lacks support for enabling a desired power saving state or an exit latency for the second composite link is above a second latency threshold, determine that an exit latency of the second composite link, with a third subset of sub-links having enabled the desired power saving state and a fourth subset of sub-links having disabled the desired power saving state, is below the second latency threshold and that the third subset supports enabling the desired power saving state, and selectively trigger at least one sub-link of the third subset to enable the desired power saving state.

Another example (e.g., example 31) relates to a previous example (e.g., one of the examples 21 to 30) or to any other example, further comprising that the apparatus is implemented by firmware.

An example (e.g., example 32) relates to an apparatus comprising interface circuitry, machine-readable instructions, and processing circuitry to execute the machine-readable instructions to determine that a first composite link of a plurality of composite peripheral component interconnect express (PCIe) links terminating at the same PCIe root port lacks support for enabling a desired power saving state or an exit latency for the first composite link is above a first latency threshold, determine whether an exit latency for a second composite link of the plurality of composite PCIe links is below a second latency threshold, and selectively trigger at least one sub-link of the second composite link to enable the desired power saving state if the exit latency for the second composite link is below the second latency threshold.

An example (e.g., example 33) relates to an apparatus comprising interface circuitry, machine-readable instructions, and processing circuitry to execute the machine-readable instructions to determine that a composite peripheral component interconnect express (PCIe) link lacks support for enabling a desired power saving state or an exit latency for the composite link is above a latency threshold, determine that an exit latency of the composite link, with a first subset of sub-links having enabled the desired power saving state and a second subset of sub-links having disabled the desired power saving state, is below the latency threshold and that the first subset supports enabling the desired power saving state, and selectively trigger at least one sub-link of the first subset to enable the desired power saving state.

An example (e.g., example 34) relates to an apparatus comprising means for communicating and means for processing, the means for processing being configured to determine that a first composite link of a plurality of composite peripheral component interconnect express (PCIe) links terminating at the same PCIe root port lacks support for enabling a desired power saving state or an exit latency for the first composite link is above a first latency threshold, determine whether an exit latency for a second composite link of the plurality of composite PCIe links is below a second latency threshold, and selectively trigger at least one sub-link of the second composite link to enable the desired power saving state if the exit latency for the second composite link is below the second latency threshold.

An example (e.g., example 35) relates to an apparatus comprising means for communicating and means for processing, the means for processing being configured to determine that a composite peripheral component interconnect express (PCIe) link lacks support for enabling a desired power saving state or an exit latency for the composite link is above a latency threshold, determine that an exit latency of the composite link, with a first subset of sub-links having enabled the desired power saving state and a second subset of sub-links having disabled the desired power saving state, is below the latency threshold and that the first subset supports enabling the desired power saving state, and selectively trigger at least one sub-link of the first subset to enable the desired power saving state.

An example (e.g., example 36) relates to a method, comprising determining that a first composite link of a plurality of composite peripheral component interconnect express (PCIe) links terminating at the same PCIe root port lacks support for enabling a desired power saving state or an exit latency for the first composite link is above a first latency threshold, determining whether an exit latency for a second composite link of the plurality of composite PCIe links is below a second latency threshold, and selectively triggering at least one sub-link of the second composite link to enable the desired power saving state if the exit latency for the second composite link is below the second latency threshold.

Another example (e.g., example 37) relates to a previous example (e.g., example 36) or to any other example, further comprising selectively triggering at least one of the sub-link and a further sub-link of the second composite link to disable the desired power saving state or a further power saving state if it is determined that the exit latency is above the second latency threshold.

Another example (e.g., example 38) relates to a previous example (e.g., one of the examples 36 or 37) or to any other example, further comprising determining whether an updated exit latency for the second composite link is below the second latency threshold after selectively triggering the sub-link to enable the desired power saving state, and selectively triggering the sub-link to disable the desired power saving state if it is determined that the updated exit latency is above the second latency threshold.

Another example (e.g., example 39) relates to a previous example (e.g., example 38) or to any other example, further comprising selectively triggering a further sub-link of the second composite link to enable the desired power saving state if it is determined that the updated exit latency is below the second latency threshold.

Another example (e.g., example 40) relates to a previous example (e.g., one of the examples 38 or 39) or to any other example, further comprising selectively triggering the sub-link or the further sub-link to enable a further power saving state if it is determined that the updated exit latency is below the second latency threshold.

Another example (e.g., example 41) relates to a previous example (e.g., one of the examples 36 to 40) or to any other example, further comprising determining whether the sub-link supports enabling the desired power saving state, wherein the sub-link is selectively triggered to enable the desired power saving state if it is determined that the sub-link supports enabling the desired power saving state.

Another example (e.g., example 42) relates to a previous example (e.g., one of the examples 36 to 41) or to any other example, further comprising determining whether an exit latency for the sub-link is above an exit latency for at least one further sub-link of the second composite link upstream of the sub-link, wherein the sub-link is selectively triggered to enable the de-sired power saving state if it is determined that the exit latency for the sub-link is above the exit latency for the further sub-link.

Another example (e.g., example 43) relates to a previous example (e.g., example 42) or to any other example, further comprising selectively triggering the further sub-link to disable the desired power saving state or a further power saving state if it is determined that the exit latency for the sub-link is below the exit latency for the further sub-link.

Another example (e.g., example 44) relates to a previous example (e.g., one of the examples 36 to 43) or to any other example, further comprising selectively triggering iteratively, for each sub-link of a plurality of sub-links of the second composite link, said sub-link to enable the desired power saving state, determining, in each iteration, whether an updated exit latency for the second composite link is below the second threshold after selectively triggering said sub-link to enable the desired power saving, and selectively triggering said sub-link to disable the desired power saving state if it is determined that the updated exit latency is above the second latency threshold.

Another example (e.g., example 45) relates to a previous example (e.g., example 44) or to any other example, further comprising determining, in each iteration, whether an exit latency for said sub-link is above an exit latency for at least one further sub-link of the plurality of sub-links upstream to said sub-link, and selectively triggering at least one of said sub-link and the further sub-link to disable the desired power saving state or a further power saving state if it is determined that the exit latency for the sub-link is below the exit latency for the further sub-link.

Another example (e.g., example 46) relates to a previous example (e.g., one of the examples 44 or 45) or to any other example, further comprising starting the iterative determination at a sub-link of the plurality of sub-links which is connected to an endpoint of the second composite link.

Another example (e.g., example 47) relates to a previous example (e.g., one of the examples 44 to 46) or to any other example, further comprising performing the iterative determination by selecting, after each iteration, a subsequent sub-link of the plurality of sub-links which is upstream to said sub-link.

Another example (e.g., example 48) relates to a previous example (e.g., one of the examples 36 to 47) or to any other example, further comprising storing, for each sub-link of the plurality of composite links, an indication whether said sub-link has been triggered to enable or disable the desired power saving state.

Another example (e.g., example 49) relates to a previous example (e.g., one of the examples 36 to 48) or to any other example, further comprising selectively triggering iteratively, for each power saving state of a plurality of power saving states comprising the desired power saving state, the sub-link to enable said power saving state, determining, in each iteration, whether an updated exit latency for the second composite link is below the second threshold after selectively triggering said sub-link to enable said power saving state, and selectively triggering said sub-link to disable said power saving state if it is determined that the updated exit latency is above the second latency threshold.

Another example (e.g., example 50) relates to a previous example (e.g., one of the examples 36 to 49) or to any other example, further comprising determining, for each composite link of the plurality of composite links, whether a respective exit latency is below a respective latency threshold, and selectively triggering at least one sub-link of said composite link to enable the desired power saving state, if it is determined the respective exit latency for said composite link is below the respective latency threshold.

Another example (e.g., example 51) relates to a previous example (e.g., one of the examples 36 to 50) or to any other example, further comprising determining, for each composite link of a plurality of composite PCIe links terminating at the same PCIe root complex comprising the PCIe root port, whether a respective exit latency is below a respective latency threshold, and selectively triggering at least one respective sub-link of said composite link to enable the desired power saving state, if it is determined the exit latency for said composite link is below the respective latency threshold.

An example (e.g., example 52) relates to a method, comprising determining that a composite peripheral component interconnect express (PCIe) link lacks support for enabling a desired power saving state or an exit latency for the composite link is above a latency threshold, determining that an exit latency of the composite link, with a first subset of sub-links having enabled the desired power saving state and a second subset of sub-links having disabled the desired power saving state, is below the latency threshold and that the first subset supports enabling the desired power saving state, and selectively triggering at least one sub-link of the first subset to enable the desired power saving state.

Another example (e.g., example 53) relates to a previous example (e.g., example 52) or to any other example, further comprising that the threshold is based on a maximal exit latency accepted by an endpoint of the composite link.

Another example (e.g., example 54) relates to a previous example (e.g., one of the examples 52 or 53) or to any other example, further comprising determining whether an exit latency for the sub-link is above an exit latency for at least one further sub-link of the composite link upstream of the sub-link, wherein selectively triggering the sub-link to enable the desired power saving state is performed if it is determined that the exit latency for the sub-link is above the exit latency for the further sub-link.

Another example (e.g., example 55) relates to a previous example (e.g., example 54) or to any other example, further comprising selectively triggering the further sub-link to disable the desired power saving state or a further power saving state if it is determined that the exit latency for the sub-link is below the exit latency for the further sub-link.

Another example (e.g., example 56) relates to a previous example (e.g., one of the examples 52 to 55) or to any other example, further comprising determining the first subset and the second subset by determining for each sub-link of a plurality of sub-links of the composite link, whether said sub-link supports enabling the desired power saving state, if it is determined that said sub-link supports enabling the desired power saving state, selectively triggering said sub-link to enable the desired power saving state, determining, after selectively triggering said sub-link to enable the desired power saving state, whether an exit latency for the composite link is below the latency threshold, if it is determined that the exit latency is below the latency threshold, allocating said sub-link to the first subset.

Another example (e.g., example 57) relates to a previous example (e.g., one of the examples 52 to 56) or to any other example, further comprising storing, for each sub-link of a plurality of sub-links of the composite link, an indication whether said sub-link has been triggered to enable or disable the desired power saving state.

Another example (e.g., example 58) relates to a previous example (e.g., one of the examples 52 to 57) or to any other example, further comprising that determining that an exit latency of the composite link, with a third subset of sub-links having enabled a further power saving state, is below the latency threshold and that the third subset supports enabling the further power saving state, and selectively triggering at least one sub-link of the third subset to enable the further power saving state.

Another example (e.g., example 59) relates to a previous example (e.g., one of the examples 52 to 58) or to any other example, further comprising determining that a second composite PCIe link, terminating at the same PCIe root complex like the composite link, lacks support for enabling a desired power saving state or an exit latency for the second composite link is above a second latency threshold, determining that an exit latency of the second composite link, with a third subset of sub-links having enabled the desired power saving state and a fourth subset of sub-links having disabled the desired power saving state, is below the second latency threshold and that the third subset supports enabling the desired power saving state, and selectively triggering at least one sub-link of the third subset to enable the desired power saving state.

Another example (e.g., example 60) relates to a non-transitory machine-readable storage medium including program code, when executed, to cause a machine to perform the method of any one of examples 36 to 59 (or according to any other example).

An example (e.g., example 61) relates to a computer program having a program code for performing the method of one of the examples 36 to 59 (or according to any other example) when the computer program is executed on a computer, a processor, or a programmable hardware component.

An example (e.g., example 62) relates to a machine-readable storage including machine readable instructions, when executed, to implement a method or realize an apparatus as claimed in any pending claim or any example shown herein.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus comprising interface circuitry, machine-readable instructions, and processing circuitry to execute the machine-readable instructions to:

determine that a first composite link of a plurality of composite peripheral component interconnect express (PCIe) links terminating at the same PCIe root port lacks support for enabling a desired power saving state or an exit latency for the first composite link is above a first latency threshold;

determine whether an exit latency for a second composite link of the plurality of composite PCIe links is below a second latency threshold; and selectively trigger at least one sub-link of the second composite link to enable the desired power saving state if the exit latency for the second composite link is below the second latency threshold.

2. The apparatus of claim 1, wherein the first threshold is based on a maximal exit latency accepted by an endpoint of the first composite link, and wherein the second latency threshold is based on a maximal exit latency accepted by an endpoint of the second composite link.

3. The apparatus of claim 1, wherein the machine-readable instructions comprise instructions to selectively trigger at least one of the sub-link and a further sub-link of the second composite link to disable the desired power saving state or a further power saving state if it is determined that the exit latency is above the second latency threshold.

4. The apparatus of claim 1, wherein the machine-readable instructions comprise instructions to:

determine whether an updated exit latency for the second composite link is below the second latency threshold after selectively triggering the sub-link to enable the desired power saving state; and selectively trigger the sub-link to disable the desired power saving state if it is determined that the updated exit latency is above the second latency threshold.

5. The apparatus of claim 4, wherein the machine-readable instructions comprise instructions to selectively trigger a further sub-link of the second composite link to enable the desired power saving state if it is determined that the updated exit latency is below the second latency threshold.

6. The apparatus of claim 4, wherein the machine-readable instructions comprise instructions to selectively trigger the sub-link or the further sub-link to enable a further power saving state if it is determined that the updated exit latency is below the second latency threshold.

7. The apparatus of claim 1, wherein the machine-readable instructions comprise instructions to determine whether the sub-link supports enabling the desired power saving state, wherein the sub-link is selectively triggered to enable the desired power saving state if it is determined that the sub-link supports enabling the desired power saving state.

8. The apparatus of claim 1, wherein the machine-readable instructions comprise instructions to determine whether an exit latency for the sub-link is above an exit latency for at least one further sub-link of the second composite link upstream of the sub-link, wherein the sub-link is selectively triggered to enable the desired power saving state if it is determined that the exit latency for the sub-link is above the exit latency for the further sub-link.

9. The apparatus of claim 8, wherein the machine-readable instructions comprise instructions to selectively trigger the further sub-link to disable the desired power saving state or a further power saving state if it is determined that the exit latency for the sub-link is below the exit latency for the further sub-link.

10. The apparatus of claim 1, wherein the machine-readable instructions comprise instructions to:

selectively trigger iteratively, for each sub-link of a plurality of sub-links of the second composite link, said sub-link to enable the desired power saving state;

determine, in each iteration, whether an updated exit latency for the second composite link is below the second threshold after selectively triggering said sub-link to enable the desired power saving; and selectively trigger said sub-link to disable the desired power saving state if it is determined that the updated exit latency is above the second latency threshold.

11. The apparatus of claim 10, wherein the machine-readable instructions comprise instructions to:

determine, in each iteration, whether an exit latency for said sub-link is above an exit latency for at least one further sub-link of the plurality of sub-links upstream to said sub-link; and selectively trigger at least one of said sub-link and the further sub-link to disable the desired power saving state or a further power saving state if it is determined that the exit latency for the sub-link is below the exit latency for the further sub-link.

12. The apparatus of claim 1, further comprising memory circuitry to store, for each sub-link of the plurality of composite links, an indication whether said sub-link has been triggered to enable or disable the desired power saving state.

13. The apparatus of claim 1, wherein the machine-readable instructions comprise instructions to:

selectively trigger iteratively, for each power saving state of a plurality of power saving states comprising the desired power saving state, the sub-link to enable said power saving state;

determine, in each iteration, whether an updated exit latency for the second composite link is below the second threshold after selectively triggering said sub-link to enable said power saving state; and selectively trigger said sub-link to disable said power saving state if it is determined that the updated exit latency is above the second latency threshold.

14. An apparatus comprising interface circuitry, machine-readable instructions, and processing circuitry to execute the machine-readable instructions to:

determine that a composite peripheral component inter-connect express (PCIe) link lacks support for enabling a desired power saving state or an exit latency for the composite link is above a latency threshold;

determine that an exit latency of the composite link, with a first subset of sub-links having enabled the desired power saving state and a second subset of sub-links having disabled the desired power saving state, is below the latency threshold and that the first subset supports enabling the desired power saving state; and selectively trigger at least one sub-link of the first subset to enable the desired power saving state.

15. The apparatus of claim 14, wherein the threshold is based on a maximal exit latency accepted by an endpoint of the composite link.

16. The apparatus of claim 14, wherein the machine-readable instructions comprise instructions to determine whether an exit latency for the sub-link is above an exit latency for at least one further sub-link of the composite link upstream of the sub-link, wherein the sub-link is selectively triggered to enable the desired power saving state if it is determined that the exit latency for the sub-link is above the exit latency for the further sub-link.

17. The apparatus of claim 16, wherein the machine-readable instructions comprise instructions to selectively trigger the further sub-link to disable the desired power saving state or a further power saving state if it is determined that the exit latency for the sub-link is below the exit latency for the further sub-link.

18. The apparatus of claim 14, wherein the machine-readable instructions comprise instructions to determine the first subset and the second subset by:

determining for each sub-link of a plurality of sub-links of the composite link, whether said sub-link supports enabling the desired power saving state;

if it is determined that said sub-link supports enabling the desired power saving state, selectively triggering said sub-link to enable the desired power saving state;

determining, after selectively triggering said sub-link to enable the desired power saving state, whether an exit latency for the composite link is below the latency threshold;

if it is determined that the exit latency is below the latency threshold, allocating said sub-link to the first subset.

19. The apparatus of claim 14, further comprising memory circuitry to store, for each sub-link of a plurality of sub-links of the composite link, an indication whether said sub-link has been triggered to enable or disable the desired power saving state.

20. The apparatus of claim 14, wherein the machine-readable instructions comprise instructions to:

determine that an exit latency of the composite link, with a third subset of sub-links having enabled a further power saving state, is below the latency threshold and that the third subset supports enabling the further power saving state; and selectively trigger at least one sub-link of the third subset to enable the further power saving state.

21. The apparatus of claim 14, wherein the machine-readable instructions comprise instructions to:

determine that a second composite PCIe link, terminating at the same PCIe root complex like the composite link, lacks support for enabling a desired power saving state or an exit latency for the second composite link is above a second latency threshold;

determine that an exit latency of the second composite link, with a third subset of sub-links having enabled the desired power saving state and a fourth subset of sub-links having disabled the desired power saving state, is below the second latency threshold and that the third subset supports enabling the desired power saving state; and selectively trigger at least one sub-link of the third subset to enable the desired power saving state.

22. A method, comprising:

determining that a first composite link of a plurality of composite peripheral component interconnect express (PCIe) links terminating at the same PCIe root port lacks support for enabling a desired power saving state or an exit latency for the first composite link is above a first latency threshold;

determining whether an exit latency for a second composite link of the plurality of composite PCIe links is below a second latency threshold; and selectively triggering at least one sub-link of the second composite link to enable the desired power saving state if the exit latency for the second composite link is below the second latency threshold.

23. A method, comprising:

determining that a composite peripheral component interconnect express (PCIe) link lacks support for enabling a desired power saving state or an exit latency for the composite link is above a latency threshold;

determining that an exit latency of the composite link, with a first subset of sub-links having enabled the desired power saving state and a second subset of sub-links having disabled the desired power saving state, is below the latency threshold and that the first subset supports enabling the desired power saving state; and selectively triggering at least one sub-link of the first subset to enable the desired power saving state.

24. A non-transitory machine-readable storage medium including program code, when executed, to cause a machine to perform the method of claim 22.

25. A non-transitory machine-readable storage medium including program code, when executed, to cause a machine to perform the method of claim 23.

* * * * *